United States Patent
Workman et al.

(10) Patent No.: US 9,362,766 B2
(45) Date of Patent: *Jun. 7, 2016

(54) RECONFIGURABLE ENERGY STORAGE AND POWER SUPPLY DEVICE

(71) Applicant: Goal Zero LLC, Bluffdale, UT (US)

(72) Inventors: Robert E. Workman, Morgan, UT (US); Norman L. Krantz, Draper, UT (US); Erik R. Workman, Salt Lake City, UT (US); Joseph R. Atkin, Highland, UT (US); Walker Ford, Bluffdale, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,456

(22) Filed: Jul. 22, 2015

(65) Prior Publication Data

US 2016/0028260 A1    Jan. 28, 2016

Related U.S. Application Data

(63) Continuation of application No. 13/719,097, filed on Dec. 18, 2012.

(60) Provisional application No. 61/584,005, filed on Jan. 6, 2012, provisional application No. 61/707,711, filed on Sep. 28, 2012.

(51) Int. Cl.
*H02J 7/00* (2006.01)
*H01R 31/06* (2006.01)
*H01R 24/38* (2011.01)

(52) U.S. Cl.
CPC .............. *H02J 7/0042* (2013.01); *H01R 31/06* (2013.01); *H01R 31/065* (2013.01); *H02J 7/0052* (2013.01); *H01R 24/38* (2013.01); *H02J 7/0045* (2013.01); *H02J 2007/0062* (2013.01)

(58) Field of Classification Search
CPC ....................................................... H02J 7/0042
USPC .................................. 439/170, 21; 320/120
See application file for complete search history.

(56) References Cited

U.S. PATENT DOCUMENTS

| D45,257 S | 2/1914 | Hasburg |
| D60,285 S | 1/1922 | Appleton |

(Continued)

FOREIGN PATENT DOCUMENTS

| WO | WO-2011/025933 | 9/2011 |
| WO | WO-2011/106431 A2 | 9/2011 |

OTHER PUBLICATIONS

U.S. Appl. No. 14/326,258, filed Jul. 8, 2014, Goal Zero LLC.

(Continued)

*Primary Examiner* — Yalkew Fantu
(74) *Attorney, Agent, or Firm* — Foley & Lardner LLP

(57) ABSTRACT

A charging device includes a body having a rechargeable energy storage device and a housing, an interface pivotally coupled to the housing, the interface including a first conductor and a second conductor and configured to transmit power between the rechargeable energy storage device and a device connected to the interface, a first rigid post, a first pin, a first compressible element positioned to press the first pin against the first rigid post, a second rigid post, a second pin, and a second compressible element positioned to press the second pin against the second rigid post. The interface is configured to pivot about an axis defined by the first pin and the second pin.

21 Claims, 27 Drawing Sheets

(56) References Cited

U.S. PATENT DOCUMENTS

| | | | |
|---|---|---|---|
| 3,026,957 A | 3/1962 | Gladstone | |
| D192,757 S | 5/1962 | Foss | |
| D201,320 S | 6/1965 | Hirohama | |
| 3,438,529 A | 4/1969 | Lohrer | |
| D221,081 S | 7/1971 | Kahn | |
| 4,497,881 A | 2/1985 | Bertolino | |
| D364,375 S | 11/1995 | Sakashita et al. | |
| 6,501,197 B1 | 12/2002 | Cornog et al. | |
| D554,621 S | 11/2007 | Yao et al. | |
| D572,586 S | 7/2008 | Medema | |
| D599,286 S | 9/2009 | Horito et al. | |
| D600,000 S | 9/2009 | Horito et al. | |
| 7,633,759 B2 * | 12/2009 | Tracy | H01R 11/05 361/727 |
| D625,251 S | 10/2010 | Workman et al. | |
| D629,746 S | 12/2010 | Workman et al. | |
| D642,057 S | 7/2011 | Reed et al. | |
| D650,771 S | 12/2011 | Chen | |
| 8,080,972 B2 | 12/2011 | Smith | |
| D651,564 S | 1/2012 | Workman et al. | |
| 8,089,244 B2 * | 1/2012 | Zhang | H01R 24/68 320/107 |
| 8,139,353 B2 | 3/2012 | Slaby et al. | |
| 8,182,274 B1 * | 5/2012 | Cheng | H01R 13/652 439/131 |
| D664,499 S | 7/2012 | Workman et al. | |
| D670,244 S | 11/2012 | Workman et al. | |
| D693,765 S | 11/2013 | Workman et al. | |
| D697,028 S | 1/2014 | Workman et al. | |
| 9,024,570 B2 | 5/2015 | Workman et al. | |
| 2005/0032403 A1 | 2/2005 | Ishihara | |
| 2009/0098750 A1 | 4/2009 | Randall | |
| 2009/0167239 A1 * | 7/2009 | Yano | H01M 8/04552 320/101 |
| 2011/0116254 A1 | 5/2011 | Workman et al. | |
| 2011/0162690 A1 | 7/2011 | Workman et al. | |
| 2011/0190659 A1 | 8/2011 | Long et al. | |
| 2011/0290307 A1 | 12/2011 | Workman et al. | |
| 2012/0223673 A1 * | 9/2012 | Chen | H02J 7/0054 320/108 |
| 2012/0281392 A1 | 11/2012 | Workman et al. | |
| 2013/0181661 A1 | 7/2013 | Workman et al. | |

OTHER PUBLICATIONS

U.S. Appl. No. 29/496,019, filed Jul. 8, 2014, Goal Zero LLC.
U.S. Appl. No. 29/513,754, filed Jan. 5, 2015, Goal Zero LLC.
U.S. Appl. No. 61/261,656, filed Nov. 16, 2009, Workman et al.
U.S. Appl. No. 61/483,515, filed May 6, 2011, Workman et al.
U.S. Appl. No. 62/022,631, filed Jul. 9, 2014, Workman et al.
U.S. Appl. No. 12/945,583, filed Nov. 12, 2010, Workman et al.
U.S. Appl. No. 13/579,266, filed Aug. 15, 2012, Workman et al.
U.S. Appl. No. 29/387,865, filed Mar. 18, 2011, Workman et al.
U.S. Appl. No. 29/410,374, filed Jan. 6, 2012, Workman et al.
U.S. Appl. No. 29/410,376, filed Jan. 6, 2012, Workman et al.
U.S. Appl. No. 29/410,386, filed Jan. 6, 2012, Workman et al.

* cited by examiner

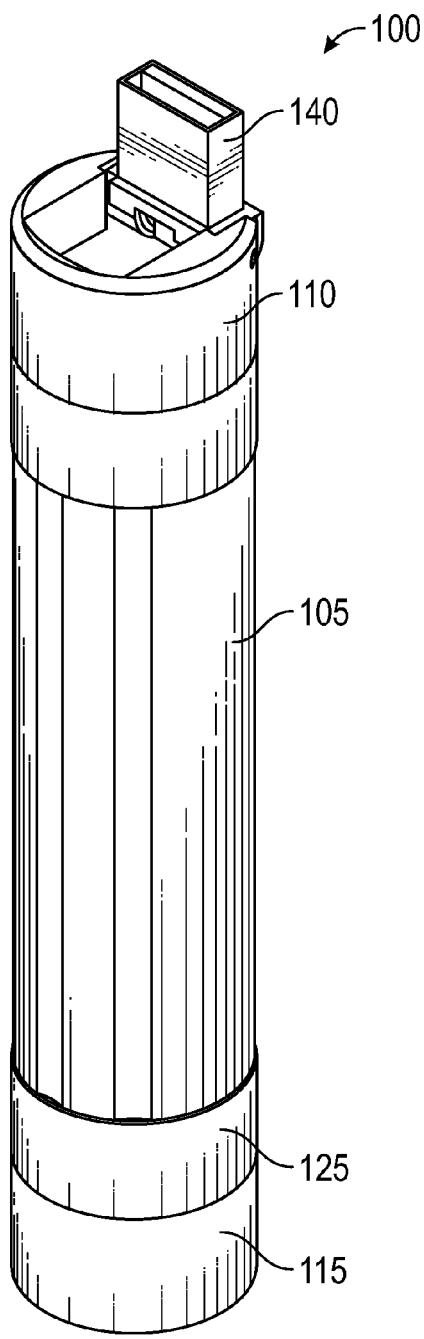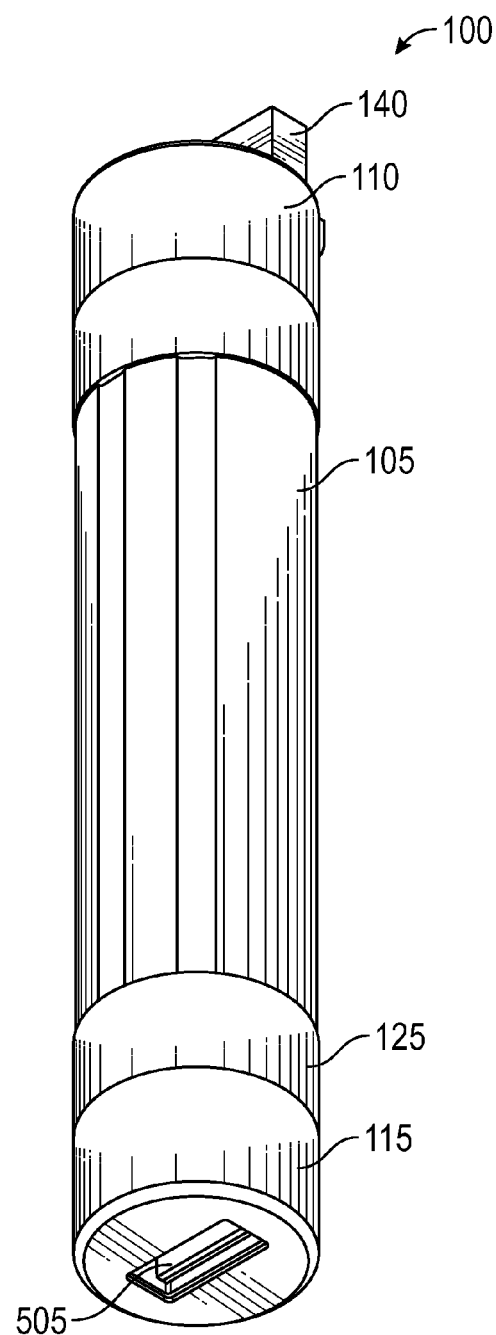
FIG. 5A
FIG. 5B

RECONFIGURABLE ENERGY STORAGE AND POWER SUPPLY DEVICE

CROSS-REFERENCE TO RELATED APPLICATIONS

The present application is a continuation of U.S. application Ser. No. 13/719,097, filed Dec. 18, 2012, which claims the benefit of U.S. Provisional Application No. 61/584,005, filed Jan. 6, 2012, and U.S. Provisional Application No. 61/707,711, filed Sep. 28, 2012, all of which are incorporated herein by reference in their entireties.

BACKGROUND

The present disclosure relates generally to the field of charging devices and methods. According to some embodiments, the present disclosure relates to a device (e.g., a portable device) for charging rechargeable energy storage devices (e.g., batteries) and/or for charging other devices. According to further embodiments, the present disclosure relates to a modular, portable, rechargeable energy storage and power supply device that provides a reconfigurable platform, which can be customized for use in a wide variety of applications by interchangeably connecting various adapters and/or accessories to recharge batteries in other devices and/or to serve as a primary source of power in a wide variety of connectible accessories.

Electrical devices often use batteries as an electrical power source for operating the devices when away from a power outlet. Batteries are used, for example, in flashlights, remote controls, computing devices (e.g., handheld computers) and accessories (e.g., keyboards, mice, etc.), mobile entertainment devices (e.g., game systems and components, audio/video players, etc.), and various other types of electrical devices. The use of batteries to power an electrical device for a length of time without the need to plug the device into a wall socket or other energy source may enhance the mobility of the device.

Electrical devices may be designed to utilize built-in batteries and/or removable batteries. Rechargeable batteries used in electrical devices that utilize built-in or fixed batteries are often recharged from within the device by connecting a power source to the device itself. The power source may be a fixed or stationary power source, such as an electrical outlet, or a portable or mobile power source, such as a rechargeable battery charger.

SUMMARY

One embodiment of the disclosure relates to a charging device that includes a body having a rechargeable energy storage device and a housing, an interface pivotally coupled to the housing, the interface including a first conductor and a second conductor and configured to transmit power between the rechargeable energy storage device and a device connected to the interface, a first rigid post, a first pin, a first compressible element positioned to press the first pin against the first rigid post, a second rigid post, a second pin, and a second compressible element positioned to press the second pin against the second rigid post. The first rigid post is coupled to a first contact associated with the rechargeable energy storage device, and the first pin is configured to couple the first rigid post to the first conductor of the interface such that the first pin and the first rigid post provide a conductive path from the first conductor of the interface to the first contact. The second rigid post is coupled to a second contact associated with the rechargeable energy storage device, and the second pin is configured to couple the second rigid post to the second conductor of the interface such that the second pin and the second rigid post provide a conductive path from the second conductor of the interface to the second contact. The interface is configured to pivot about an axis defined by the first pin and the second pin.

Another embodiment of the disclosure relates to a charging device that includes a body and a modular adapter. The body includes a rechargeable energy storage device and a housing, the housing having at least a first coupling portion. The modular adapter has a second coupling portion configured to be mated to the first coupling portion of the housing. The modular adapter includes an interface having a first conductor and a second conductor and configured to transmit power between the rechargeable energy storage device and a device connected to the interface, and adapter base, a first rigid post coupled to a first contact of the adapter base, a first pin, a first compressible element positioned to press the first pin against the first rigid post, a second rigid post coupled to a second contact of the adapter base, a second pin, and a second compressible element positioned to press the second pin against the second rigid post. The adapter base includes a plurality of contacts configured to be electrically coupled with contacts of the body, the first pin is configured to couple the first rigid post to the first conductor of the interface such that the first pin and the first rigid post provide a conductive path from the first conductor of the interface to the first contact of the adapter base, the second pin is configured to couple the second rigid post to the second conductor of the interface such that the second pin and the second rigid post provide a conductive path from the second conductor of the interface to the second contact of the adapter base, and the interface is configured to pivot about an axis defined by the first pin and the second pin. When the modular adapter is mated to the housing, the body and the modular adapter form a single substantially rigid structure.

Another embodiment of the disclosure relates to a modular adapter for a charging device that includes an interface, an adapter base, a first rigid post coupled to a first contact of the adapter base, a first pin, a first compressible element positioned to press the first pin against the first rigid post, a second rigid post coupled to a second contact of the adapter base, a second pin, and a second compressible element positioned to press the second pin against the second rigid post. The interface includes a first conductor and a second conductor and is configured to transmit power between the charging device and a device connected to the interface. The adapter base includes a plurality of contacts configured to be electrically coupled with contacts of the charging device, the first pin is configured to couple the first rigid post to the first conductor of the interface such that the first pin and the first rigid post provide a conductive path from the first conductor of the interface to the first contact of the adapter base, the second pin is configured to couple the second rigid post to the second conductor of the interface such that the second pin and the second rigid post provide a conductive path from the second conductor of the interface to the second contact of the adapter base, and the interface is configured to pivot about an axis defined by the first pin and the second pin.

BRIEF DESCRIPTION OF THE DRAWINGS

FIGS. 5A through 5C are various illustrative views of the charging device shown in FIGS. 1, 2A and 3A-4 with attached modular adapters according to an exemplary embodiment.

DETAILED DESCRIPTION

Figure 1:
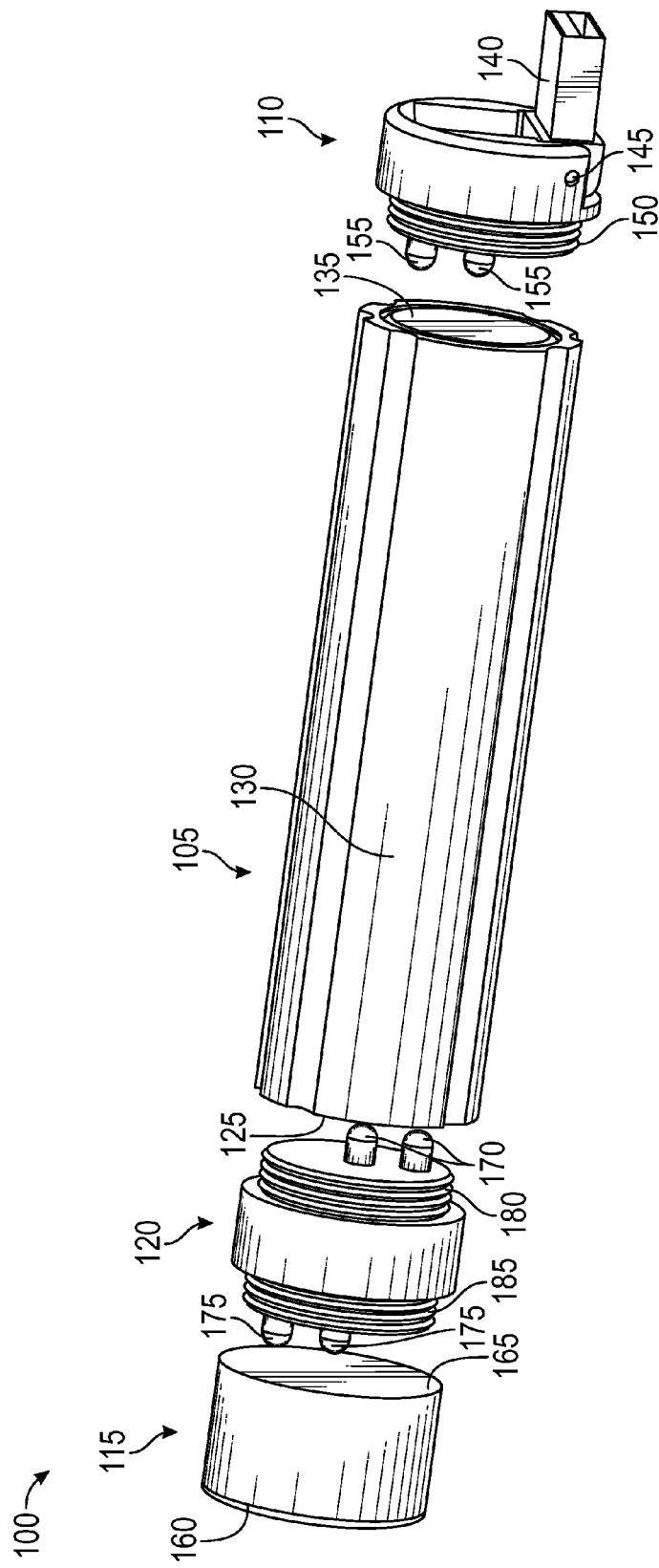
FIG. 1 is an illustrative view of a charging device according to an exemplary embodiment.

Referring generally to the figures, a modular, portable, rechargeable energy storage and power supply device is shown that provides a reconfigurable platform, which can be customized for use in a wide variety of applications by interchangeably connecting various adapters and/or accessories, according to various exemplary embodiments. The modular, portable, rechargeable energy storage and power supply device provides an electrical output at multiple voltage levels to support a wide variety of adapters and accessories that operate at different voltages, through the use of a concentric pin configuration that provides a "smart" device that recognizes the required voltage level of the adapter or accessory through mating contacts (e.g. rings, etc.) that engage the appropriate concentrically-positioned contacts. The applications include recharging applications for recharging other devices by connecting to the energy storage and power supply device an adapter having the appropriate hardware to engage the device to be recharged. The hardware on the adapter may be selectively deployable between a stowed position and an engagement position (e.g. by folding into a compartment in the adapter or the like). The adapters for use with the energy storage and power supply device may also be configured as couplers to connect multiple energy storage and power supply devices to one another, e.g. in a series or parallel configuration to provide increased voltage or capacity. The applications also include coupling or a wide variety of accessories intended to be powered directly and primarily by the energy storage and power supply device. The accessories may be connected directly to the energy storage and power supply device, or indirectly through one or more adapters, and may include (among others) lighting devices (e.g. LED lights, flashlights, lanterns, etc.), medical devices, GPS devices, camping and/or expeditioning equipment, tools, wireless communication devices and other portable accessories that may be interchangeably coupled to the energy storage and power supply device. The adapters and accessories may also be combined in a variety of 'hybrid' configurations, such as adapters having multiple parallel output connections for receiving multiple accessories and/or further adapters (e.g. in the manner of a splitter or the like). Although only a few embodiments are shown and described herein, the disclosure includes an energy storage and power supply device having a core portion with a rechargeable battery contained therein, and mechanical connecting structure and a smart electrical contact configuration on each end that provides a platform configured to interchangeably receive a wide array of adapters and accessories for customizing the device for use in a wide variety of applications.

Referring further to the figures, devices and methods for charging rechargeable energy storage devices, such as one or more batteries (e.g., lithium ion, NiMH, etc.), and/or for charging electrical and/or electronic devices are shown and described according to various exemplary embodiments. The charging device may be connected to an external energy source, such as an electrical outlet (e.g., a 110 volt outlet connected to the device through a transformer that transforms the electrical signal to a lower voltage) or a computer (e.g., through a Universal Serial Bus, or USB, connector or other type of connector) that provides the power to charge a battery of the charging device. In some embodiments, the charging device may be configured to receive electrical power for charging the batteries from a solar panel (e.g., a mobile solar panel).

In some embodiments, the charging device may be configured to provide power to various devices using different modular adapters or ports. For example, the charging device may be configured to allow different modular adapters to be coupled and decoupled from a base of the charging device to allow connection of various devices using various different types of connections, such as USB, mini or micro-USB, and/or various types of proprietary connections for the various devices. In some embodiments, various types of devices other than connectors may additionally or alternatively be coupled to the base of the charging device, such as a flashlight or lantern.

In some embodiments, the modular adapters of the charging device may be rigid or semi-rigid structures. Such modular adapters may be coupled to the base so that the entire charging device, including the base and the modular adapters, may combine to be a rigid or semi-rigid structure. Such embodiments may help make the charging device more mobile-friendly, as a user may pre-plan the modular adapters that he or she plans to use, attach those modular adapters to the base, and pack only the charging device (e.g., as compared to a charging device that uses external wire-based adapters to connect devices, where the wires must be packed along with the base unit). In some embodiments, the charging device may include external adapters (e.g., wire-based adapters) to connect to some devices. In some embodiments, the modular adapters may be cap-like devices that secure to one or more ends of a base of the charging device (e.g., via threads on the base and the modular adapters). In some embodiments, multiple charging devices may be chained together to increase the total charging capacity.

In some embodiments, the base of the charging device may connect to the modular adapters using an array of contacts. Different contacts may be configured to receive or provide power at various different voltages (e.g., 3.7V, 5V, etc.). In some embodiments, the charging device may have a cylindrical shape and the contacts may be arranged at ends of the charging device on different concentric circles in a "bullseye" pattern. In one exemplary embodiment, one contact of an exemplary base unit may be located in the center of the end and configured to receive/provide power at a first voltage level, two contacts may be located on a first concentric circle and configured to receive/provide power at a second voltage level, and two contacts may be located on a second concentric circle and configured to receive/provide a ground reference. Providing multiple contacts associated with the same voltage level may enable the charging device to increase the maximum current flow into or out of the charging device at that voltage level. Providing input and/or output contacts at different voltage levels allows the charging device to receive input power from and/or provide output power to a variety of input/output devices that may be configured to operate using different voltage levels (e.g., a first device may be configured to receive power at 3.7V, a second device may be configured to receive power at 5V, etc.).

Referring now to FIG. 1, an illustrative view of a charging device 100 is shown according to an exemplary embodiment. Charging device 100 is configured to provide power to charge and/or operate various electrical and/or electronic devices, such as mobile computing devices, cellular phones, gaming devices, computers, etc. Charging device 100 includes a rechargeable battery (e.g., lithium ion, NiMH, etc.) or other energy storage device that may be charged using an input power source such as a electrical socket or a computer (e.g., via Universal Serial Bus, or USB). In some exemplary embodiments, the battery may be a "smart" battery configured to automatically turn on or off and/or automatically charge and/or discharge based on various battery characteristics (e.g., charge level, idle time, etc.). In one exemplary embodiment, the battery may be a 3.7V, 2.2 Ah lithium battery with a storage capacity of 8.14 Wh. The accumulated charge within the rechargeable battery may be used to provide power to the various devices connected to one or more outputs of charging device 100.

Charging device 100 includes a base 105 that includes the rechargeable battery. Base 105 may also include other circuitry, such as voltage regulation circuitry configured to convert input and/or output power from one voltage to another. For example, base 105 may include a lithium ion battery configured to charge and discharge at 3.7V (in various embodiments, this voltage may differ). In some embodiments, input power for charging the battery may be received at different voltages, such as 5V (e.g., from a USB port), 6.5V (e.g., from an solar input device), etc. Base 105 may include a voltage regulation circuit configured to convert the voltage of the input power signal from the original input voltage to 3.7V. In some embodiments, output power may be provided to devices at a different voltage than 3.7V, and a voltage regulation circuit of base 105 may be configured to convert the output power from 3.7V to the desired output voltage. As described in greater detail below, in some embodiments, base 105 may be configured to provide output power and/or receive input power at multiple different voltages (e.g., 3.7V and 5V), such that various input and/or output devices can provide or receive power at different voltage levels. In some embodiments, base 105 may include an elongated, substantially cylindrical housing 130, and input/output contacts may be provided at ends 125, 135 of base 105.

Charging device 100 may be configured to receive input power from various devices and/or provide output power to various devices using different modular adapters. In the illustrated exemplary embodiment, charging device 100 includes a first modular adapter 110 configured to provide a male USB interface 140 for use in interfacing with various USB power input/output (I/O) devices. Adapter 110 is configured to be mechanically coupled to base 105 by twisting a threaded portion 150 of adapter 110 onto a corresponding threaded portion of base 105 at end 135 until adapter 110 is in solid contact with end 135. As adapter 110 and base 105 are properly mechanically mated, contacts 155 of adapter 110 (e.g., male contacts, electrodes, ports, etc.) are moved into contact with corresponding contacts of base 105 proximate to end 135, electrically coupling adapter 110 to base 105. In the illustrated exemplary embodiment, male USB interface 140 of adapter 110 is configured to flip up for use and flip down for travel or storage using a hinge 145, which may help avoid damaging the male USB connector when not in use.

Charging device 100 may include a second modular adapter 115 configured to provide a female USB interface 160 for use in interfacing with USB power I/O devices. In some embodiments, adapter 115 may include a male threaded portion similar to adapter 110 and connect to base 105 in substantially the same manner. In the illustrated exemplary embodiment, adapter 115 includes a female threaded portion and female electrical contacts proximate to inner end 165 of adapter 115 (not visible in FIG. 1), and base 105 includes a female threaded portion and female contacts proximate to end 125 of base 105. A male-male coupler 120 may be used to mechanically and electrically couple adapter 115 to base 105. Coupler 120 includes a male threaded portion 185 configured to mechanically connect coupler 120 to adapter 115 and male contacts 175 configured to electrically connect coupler 120 to adapter 115. Coupler 120 includes a male threaded portion 180 configured to mechanically connect coupler 120 to end 125 of base 105 and male contacts 170 configured to electrically connect coupler 120 to base 105.

Charging device 100 may be configured to receive input power and/or provide output power from or to various devices using modular adapters such as adapters 110 and/or 115. In some embodiments, adapter 110 having male USB interface 140 may be used to receive input power to charge the energy storage device of charging device 100 (e.g., via a transformer plugged into a 110V wall socket or 12V auto socket, a USB port of a computing device, etc.), and adapter 115 having female USB interface 160 may be configured to provide output power to devices connected to interface 160 (e.g., devices configured to connect to female USB ports). In some embodiments, charging device 100 may be configured such that the polarity may be reversed (e.g., permanently, temporarily, selectively, etc.) for one or both of interfaces 110 and/or 115, such that adapter 110 may be configured to provide output power and/or adapter 115 is configured to receive input power. In some implementations, adapters 110, 115 and/or base 105 may include circuitry configured to detect whether a power source or a load is connected to adapters 110 and/or 115 and to receive input power and/or provide output power accordingly. In various embodiments, one adapter may be configured to receive input power and the other adapter may be configured to provide output power, both adapters may be configured to receive input power, both adapters may be configured to provide output power, etc. In various embodiments, charging device 100 may include more than two adapter interfaces. In some embodiments, charging device 100 may include a single adapter interface and may provide a method (e.g., a selector switch, circuitry configured to sense polarity, etc.) to configure the adapter interface as an input or output interface based on the connected modular adapter and/or connected power source or load.

In various embodiments, charging device 100 may be used with a variety of different modular adapters configured to connect charging device 100 to different devices. For example, modular adapters may be provided for providing male and/or female connectors of various types, such as USB, mini-USB, micro-USB, firewire, proprietary connectors associated with different devices, etc. In various embodiments, various different types of modular adapters providing various different interfaces may be used with charging device 100. In some embodiments, modular adapters may include devices or accessories themselves rather than or in addition to providing interfaces for connecting charging device 100 to other devices. For example, the modular adapters may include flashlights or lanterns that can be connected to base 105 to provide a light source. In various exemplary embodiments, the modular adapters may include lights, flashlights, lanterns, strobes, emergency indicators or alarms, fans, magnets, hooks, tripods, stands, rings, toothbrushes, phone charging tips, electronics charging tips, straps, heaters, hand warmers, monitors (e.g., health monitors), tools, shavers, chaining adapters to connect multiple charging devices in parallel and/or series, speakers, and/or any other types of adapters and/or accessories.

In some embodiments, one or more of the modular adapters may include input/output interfaces that are rigid or semi-rigid structures within the modular adapters, such that, when the modular adapters are coupled to base 105, charging device 100, including one or more interfaces needed to connect to devices, is a single rigid or semi-rigid structure. In one embodiment, base 105 has a cylindrical housing and the modular adapters are cylindrical cap-shaped structures configured to be mated to base 105. In other embodiments, base 105 and/or the modular adapters may include different shapes and/or structures. In various embodiments, base 105, modular adapters 110, 115, coupler 120, and/or other components of charging device 100 may include metal (aluminum), plastic, and/or other types of materials.

In the illustrated exemplary embodiment, adapters 110, 115 are mechanically coupled to base 105 using male and female threaded portions configured to mate to one another. In other exemplary embodiments, different methods of mating modular adapters to a base may be used, such as guide-pins, latches (e.g., quarter-turn mating latches), magnets, or any other method of mechanically mating the modular adapters to the base.

Figure 2A:
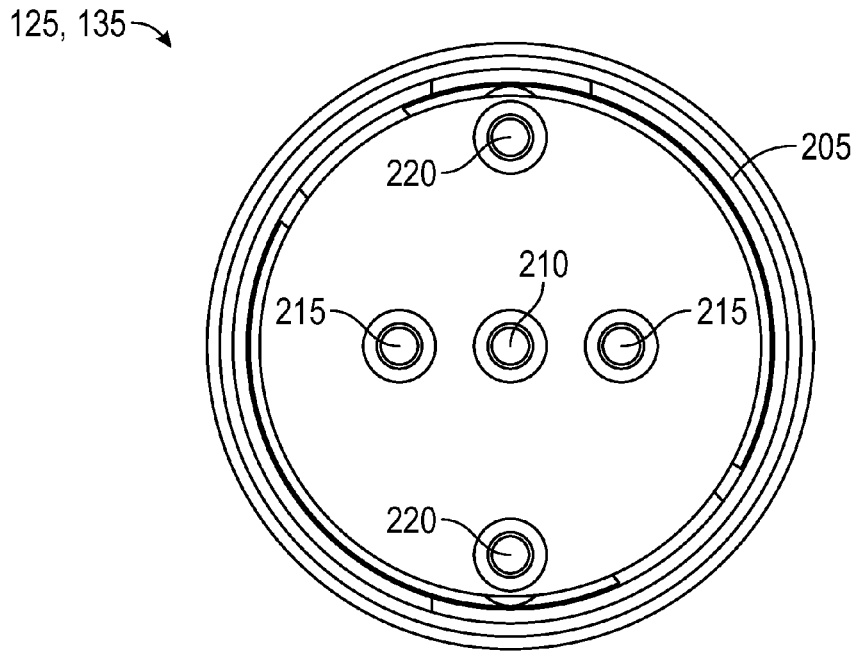
FIG. 2A is an illustrative view of an end of the charging device shown in FIG. 1 according to an exemplary embodiment.

Referring now to FIG. 2A, an illustrative view of an end (e.g., end 125 and/or 135) of base 105 of charging device 100 is shown according to an exemplary embodiment. In the illustrated exemplary embodiment, each end of base 105 includes several output contacts or terminals to which modular adapters can be connected to receive or provide power at various voltages. A first contact 210 may be configured to receive or provide power at a first voltage. For example, first contact 210 may be configured to receive or provide power at approximately 5V (e.g., for connection to USB modular adapters). A second set of contacts 215 may be configured to receive or provide power at a second voltage. For example, contacts 215 may receive or provide power at 3.7V (e.g., for use with a lantern adapter). A third set of contacts 220 may be configured to receive or provide a ground reference. In some embodiments, one or more contacts may be associated with a native, unregulated voltage of the energy storage device of charging adapter 100. In some embodiments, one or more contacts may be associated with a voltage that is higher or lower than the native voltage of the energy storage device, and charging device 100 may include one or more regulation circuits configured to upconvert or downconvert the voltage to or from the native voltage of the energy storage device. Ends 125, 135 of base 105 include threaded portion 205 configured to mechanically mate base 105 to the modular adapters. In some implementations, threaded portion 205 may also electrically couple base 105 to the modular adapters (e.g., as a grounding interface between threaded portion 205 and threads of the modular adapters).

In the illustrated exemplary embodiment, ends 125, 135 include sets of paired contacts 215 and 220. In some embodiments, one or more modular adapters connected to base 105 may include contacts configured to electrically couple the modular adapters to both contacts in a set (e.g., both contacts 215). Connecting a modular adapter to both contacts may allow for a higher current to be provided through the modular adapter, which may enable faster charging of connected devices. In one exemplary embodiment, a current throughput of up to approximately 1 A or 1.5 A may be achieved through contact 210, and a current throughput of up to approximately 4 A may be achieved through contacts 215. In some embodiments, one or more modular adapters may connect to only one of the contacts 215. Various types of modular connectors may be provided having contacts configured to electrically couple the modular adapters to different contacts of base 105. For example, a USB adapter may include contacts that couple to first contact 210 (e.g., 5V) and third contacts 220 (e.g., ground) and a lantern adapter may include contacts that couple to second contacts 215 (e.g., 3.7V) and third contacts 220 (e.g., ground).

In the illustrated exemplary embodiment, paired contacts are arranged in a "bulls-eye" pattern on concentric circles. First contact 210 is provided in the center of ends 125, 135 and is not paired with another contact. Two paired second contacts 215 are located on the same concentric circle (i.e., approximately the same distance from the center contact 210) and are located opposite one another. Two paired third contacts 220 are located on the same larger concentric circle (e.g., a greater distance away from center contact 210 than contacts 215) and are located opposite one another. In various alternative embodiments, multiple output contacts may be provided that may not be organized in this "bulls-eye" pattern.

Figure 2B:
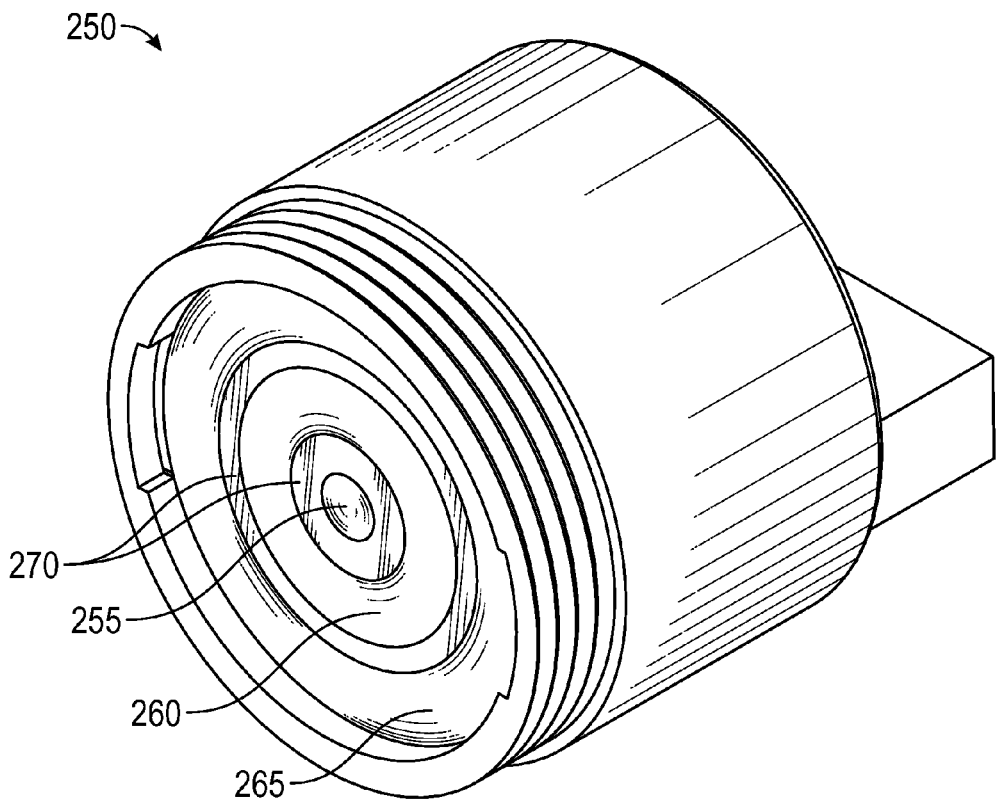
FIG. 2B is an illustrative view of an end of an adapter for use with a charging device according to an exemplary embodiment.

FIG. 2B provides an illustrative view of an end of an adapter 250 according to an exemplary embodiment. The illustrated end may be configured to electrically couple adapter 250 to a charging device. In the illustrated embodiment, adapter 250 includes several conductive zones (e.g., female contacts) that are configured to mate with corresponding prongs (e.g., male contacts) of a charging device. One of more of the zones may be concentric rings located around a center point of a cross-section of the adapter end. In one embodiment, adapter 250 may be configured to mate with end 125, 135 of body 105 as illustrated in FIG. 2A. Adapter 250 may include a first contact 255 located in the center of the end of adapter 250 and configured to mate with a center prong of the body of the charging device (e.g., contact 210). First contact 255 may be configured to transmit power at a first voltage (e.g., 5V). A second contact 260 may include a ring-shaped region surrounding first contact 255 and may be configured to mate with corresponding prongs of the body (e.g., contacts 215). Second contact 260 may be configured to transmit power at a second voltage (e.g., 3.7V). A third contact 265 may include a ring-shaped region surrounding both first contact 255 and second contact 260 and may be configured to mate with corresponding prongs of the body (e.g., contacts 220). Third contact 265 may be configured to provide a grounding interface between adapter 250 and the body of the charging device. In various exemplary embodiments, adapter 250 and/or the body may be configured to include any number of different pairs of corresponding contacts (e.g., two, three, four, five, etc.), each of which may be configured to transmit power at the same or different voltage and/or current levels than other contacts. Buffer regions 270 may include non-conductive, or insulative, material configured to electrically isolate contacts 255, 260, and 265 from one another.

Figure 2C:
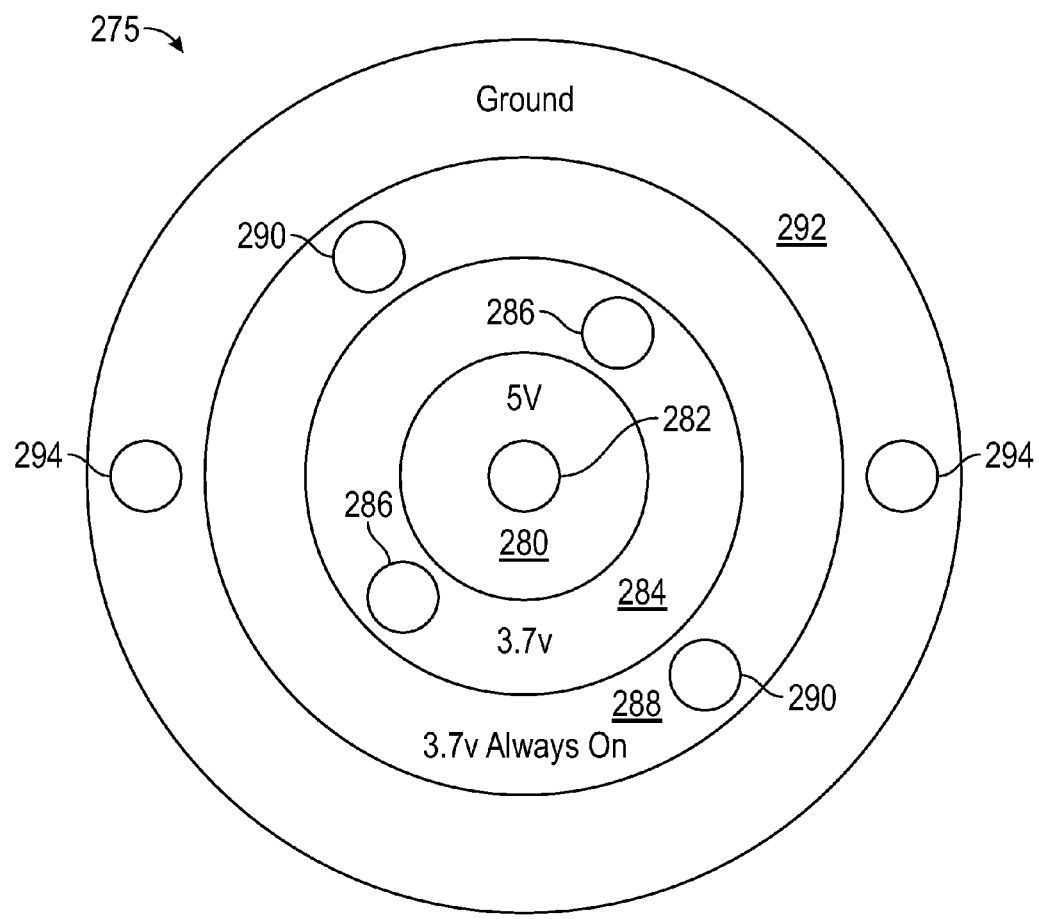
FIG. 2C is an illustrative view of a contact arrangement for a charging device according to an exemplary embodiment.

FIG. 2C provides an illustrative view of a contact arrangement 275 or interface between a body of a charging device and an adapter according to an exemplary embodiment. Male contacts (e.g., prongs) and/or female contacts (e.g., rings, recesses, etc.) may be provided as part of the body, the adapter, or both. In some exemplary embodiments, the adapter includes a female interface including several concentric circular or ring-shaped regions, and the body includes a male interface having several corresponding prongs or male contacts. One or more sets of two or more prongs may be included on the male interface, and the prongs in each set may be positioned equidistant from a center of the interface (e.g., in a "bulls-eye" configuration). In some embodiments, the sets of prongs may be positioned in a manner to increase the distance between contacts on the interface. For example, in the illustrated exemplary embodiment, male contacts corresponding to a region are offset by approximately sixty degrees in the circumferential direction from corresponding contacts in adjacent regions.

In the illustrated exemplary embodiment of FIG. 2C, a first female contact 280 of the adapter is configured to mate with a first male contact 282 of the charging device body. The charging device may be configured to provide and/or receive power at a first voltage (e.g., approximately 5V) through the connection between contacts 280 and 282. A second female contact 284 of the adapter is configured to mate with two second male contacts 286 of the body, and the charging device may be configured to provide and/or receive power at a second voltage (e.g., approximately 3.7V) through the connection between contacts 284 and 286. A third female contact 288 of the adapter is configured to mate with two third male contacts 290 of the body. A fourth female contact 292 of the adapter is configured to mate with two fourth male contacts 294 of the body to provide a grounding interface.

In some embodiments, the third contacts and/or any other contacts may be used to provide an "always on" input interface for receiving input power to charge a battery of the charging device. For example, in some embodiments, an on/off switch may be configured to disable the flow of power into and out of the battery to avoid draining the battery (e.g., through a 5V regulator and/or other circuitry) when not in use. An input connection (e.g., a 3.7V input) may be provided that remains connected to a charging circuit of the charging device and able to charge the battery even if a main power switch is in the "off" position and disabling flow through the other contacts. In some embodiments, various adapters may be configured to use or not use this "always on" interface (e.g., some adapters may not include pins configured to contact third female interface 288). In some embodiments, special adapters (e.g., a motion sensor adapter) may be provided to use this interface as an output interface to receive power from the battery and function even if the on/off switch is in an "off" position.

Figure 3A:
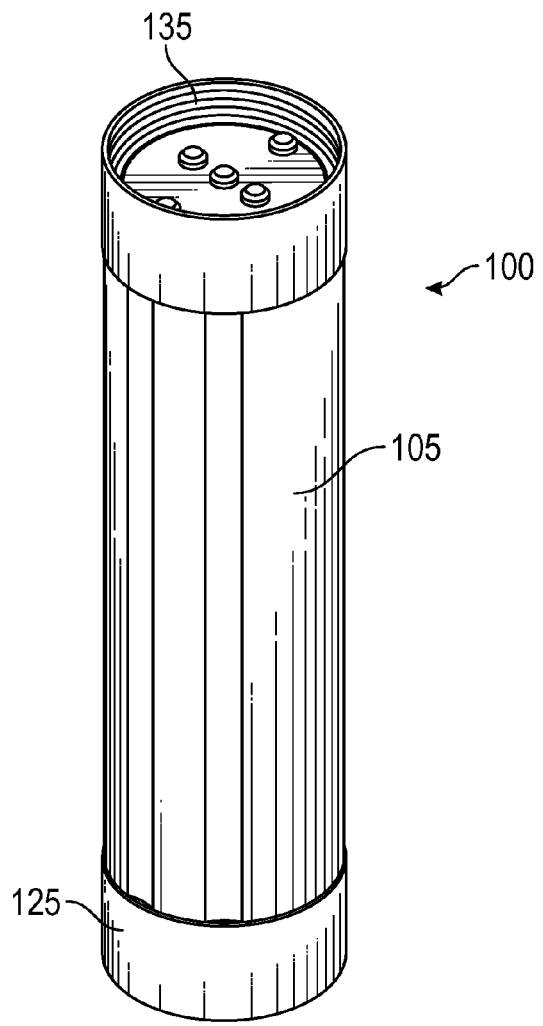
FIGS. 3A and 3B are various illustrative views of the body for the charging device shown in FIGS. 1 and 2A without modular adapters attached according to exemplary embodiments.
Figure 3B:
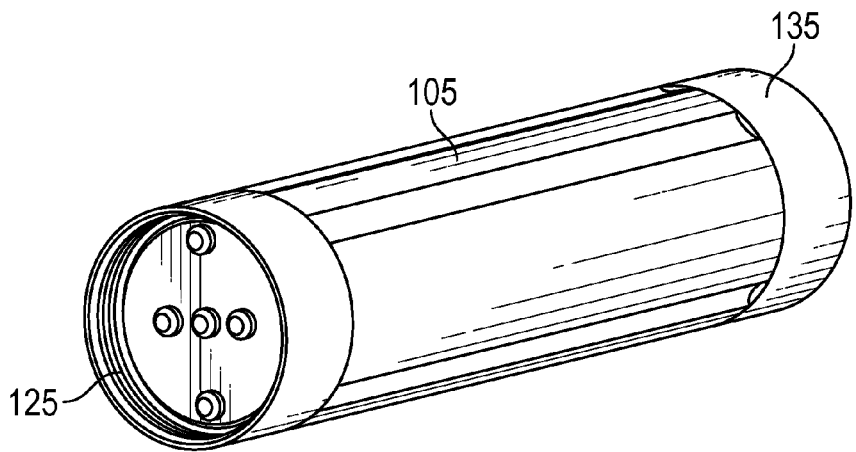

FIGS. 3A and 3B show various illustrative views of body 105 of charging device 100 without modular adapters attached according to exemplary embodiments. FIGS. 3A and 3B illustrate in further detail what the threaded portions and contacts proximate to ends 125 and 135 of body 105 may look like according to exemplary embodiments.

Figure 4:
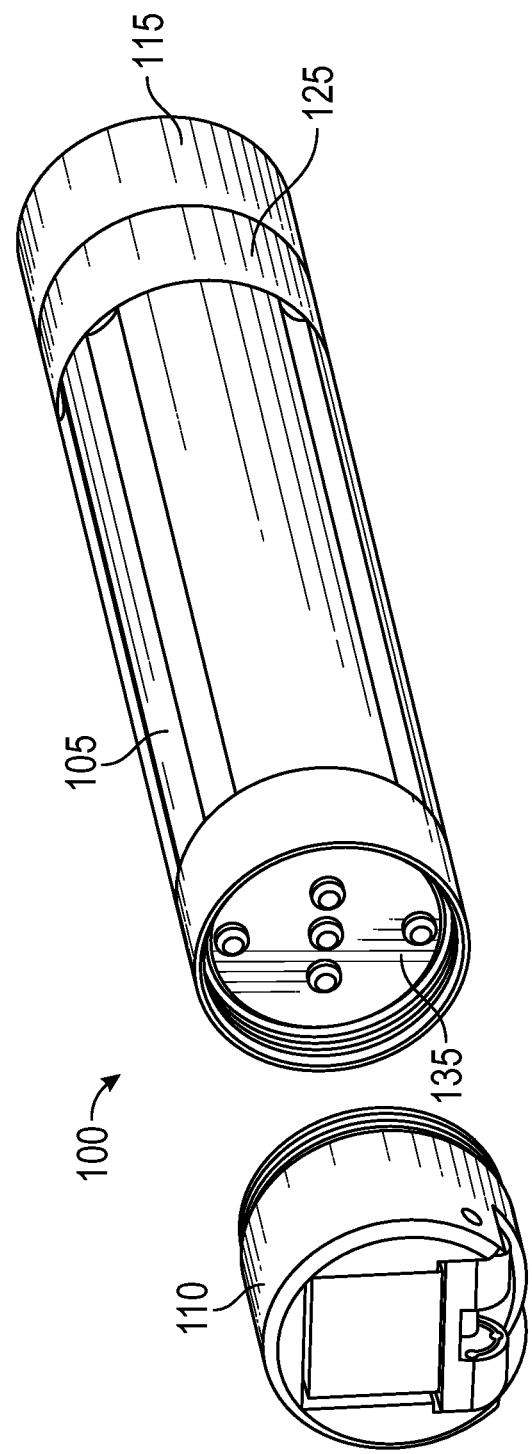
FIG. 4 is an illustrative view of the charging device shown in FIGS. 1, 2A, 3A, and 3B and including modular adapters according to an exemplary embodiment.

FIG. 4 provides an illustrative view of charging device 100 with adapter 115 attached to body 105 and adapter 110 illustrated but detached from body 105 according to an exemplary embodiment. FIG. 4 illustrates the male threaded portion of adapter 110 that is designed to mate with a corresponding female threaded portion of body 105 proximate to end 135.

Figure 5C:
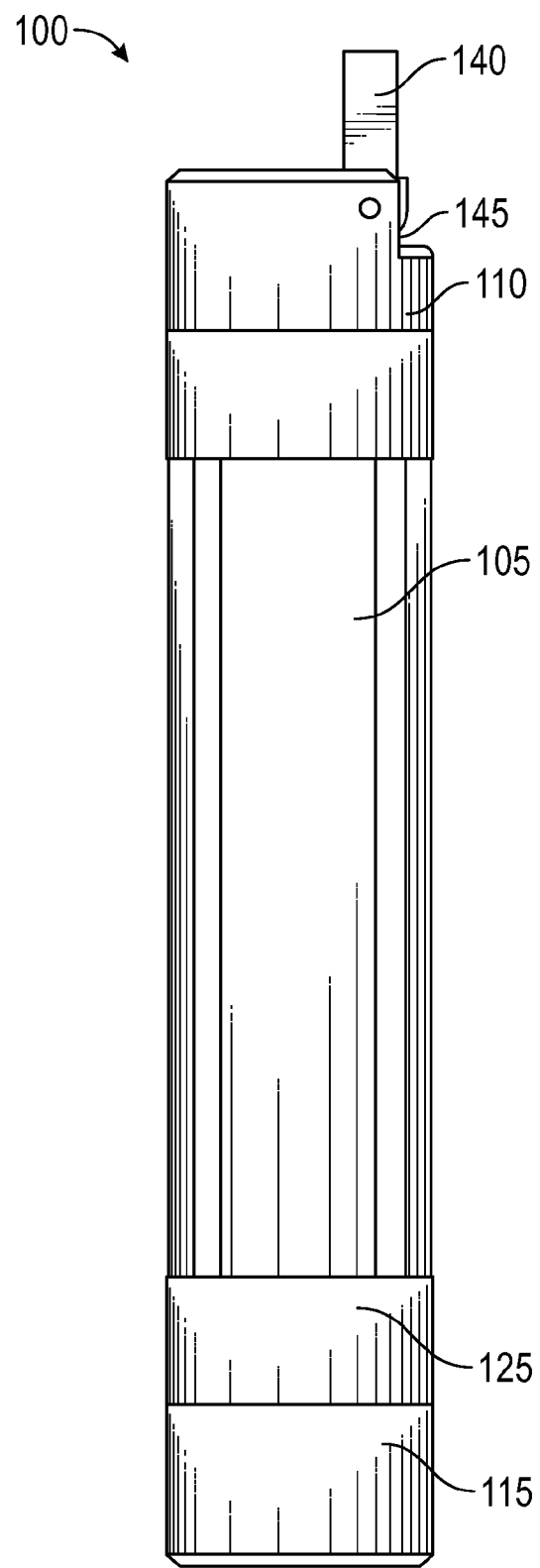

FIGS. 5A through 5C provide illustrative views of charging device 100 as it may appear after adapter 110 is securely mated with body 105 according to an exemplary embodiment. FIG. 5A provides a view of the end of adapter 110 with male USB interface 140 in an upright position and ready for connection to a female USB port (e.g., for charging an energy storage device of charging device 100). FIG. 5B provides a view of the end of adapter 115 showing a female USB interface 505 (e.g., for providing power to connected devices). FIG. 5C provides a side view of charging device 100 illustrating a hinge 145 of adapter 110 used in moving male USB interface 140 between a closed or flipped-down and open or flipped-up configuration. In various exemplary embodiments, other types of interfaces may additionally or alternatively be provided using hinged and/or extendable methods.

Figure 6A:
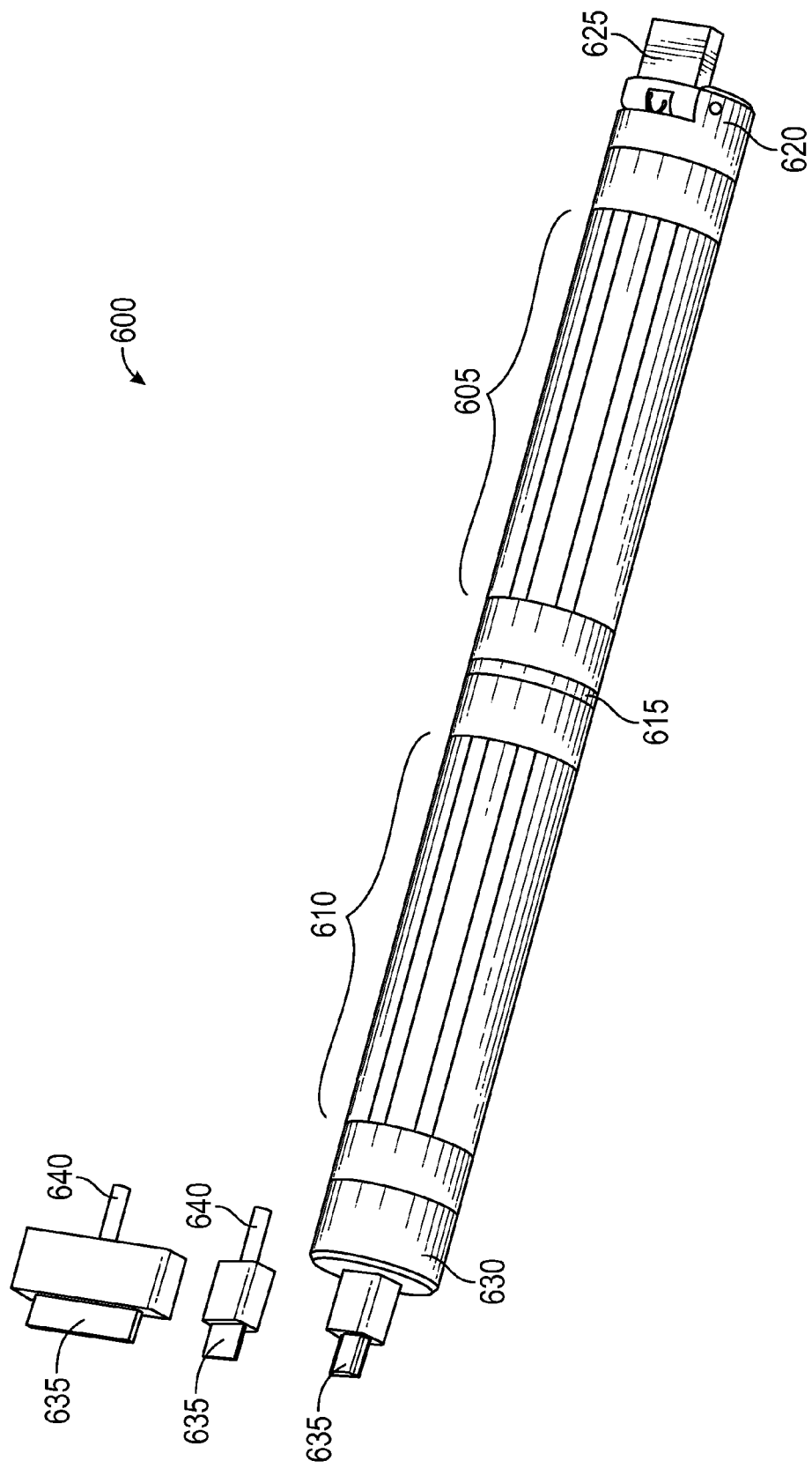
FIGS. 6A and 6B are illustrative views of a charging system having two charging devices coupled to one another according to an exemplary embodiment.
Figure 6B:
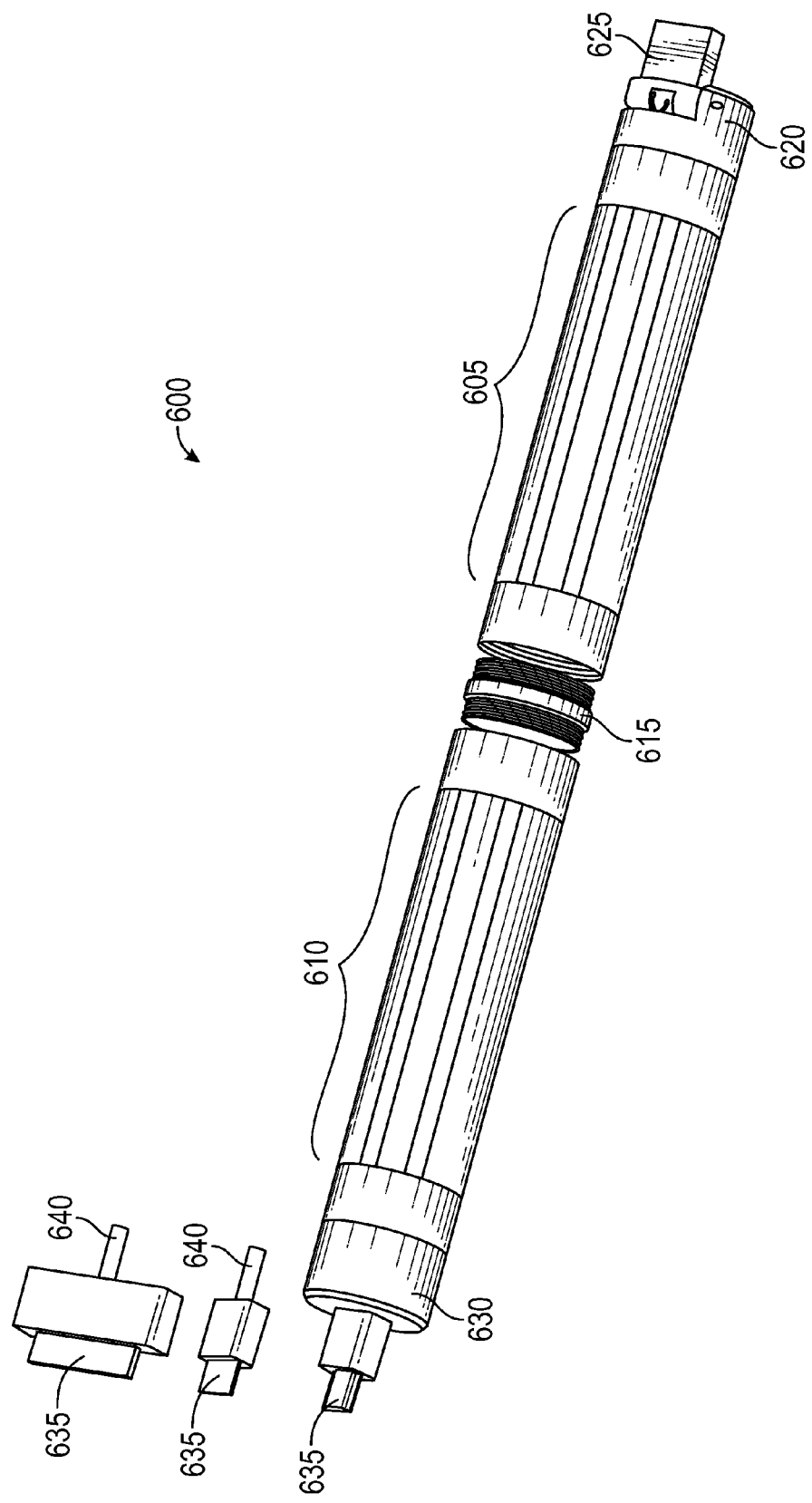
Figure 7A:
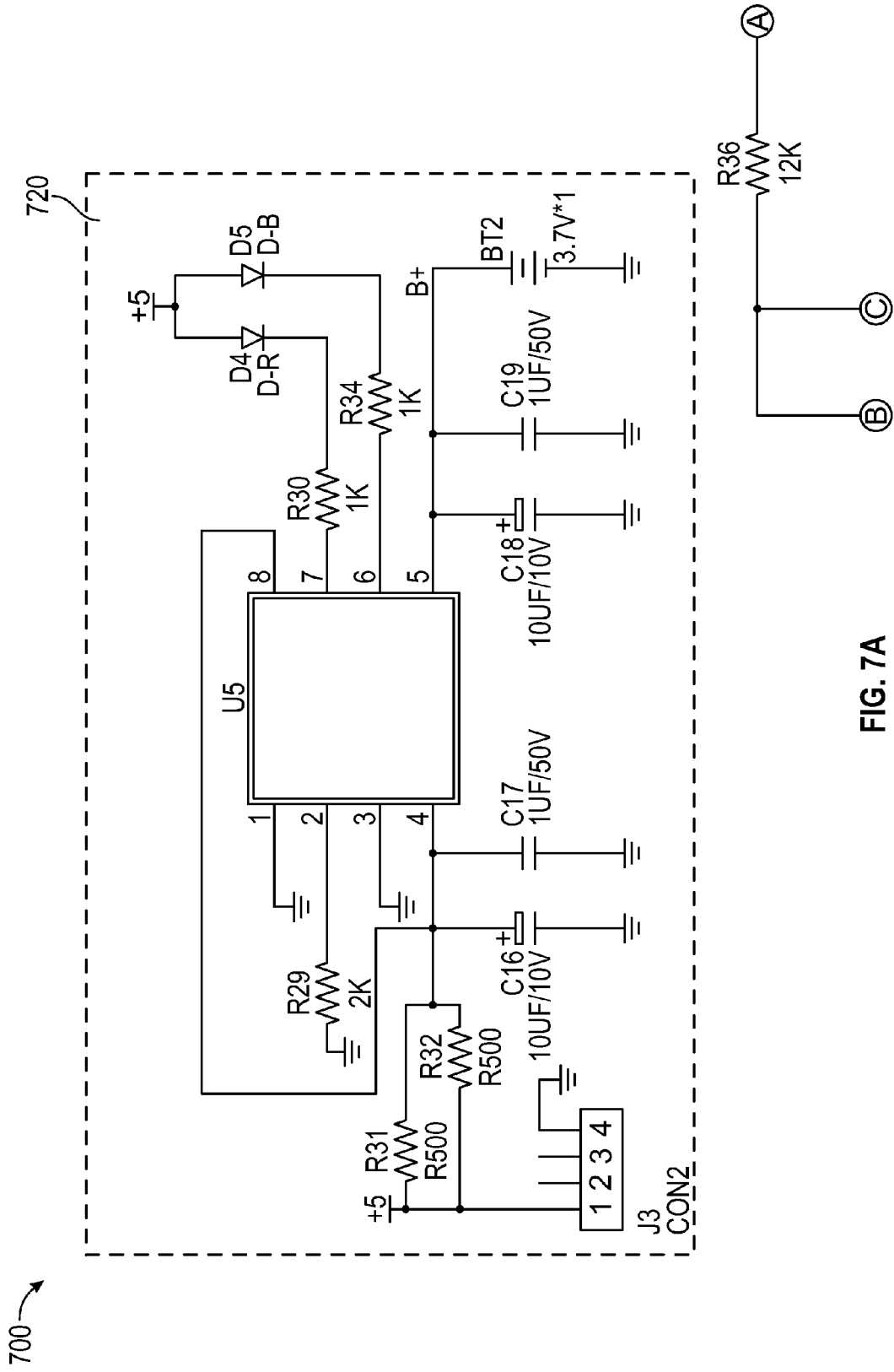
FIGS. 7A-7D show a circuit diagram of a circuit of a charging device according to an exemplary embodiment.
Figure 7B:
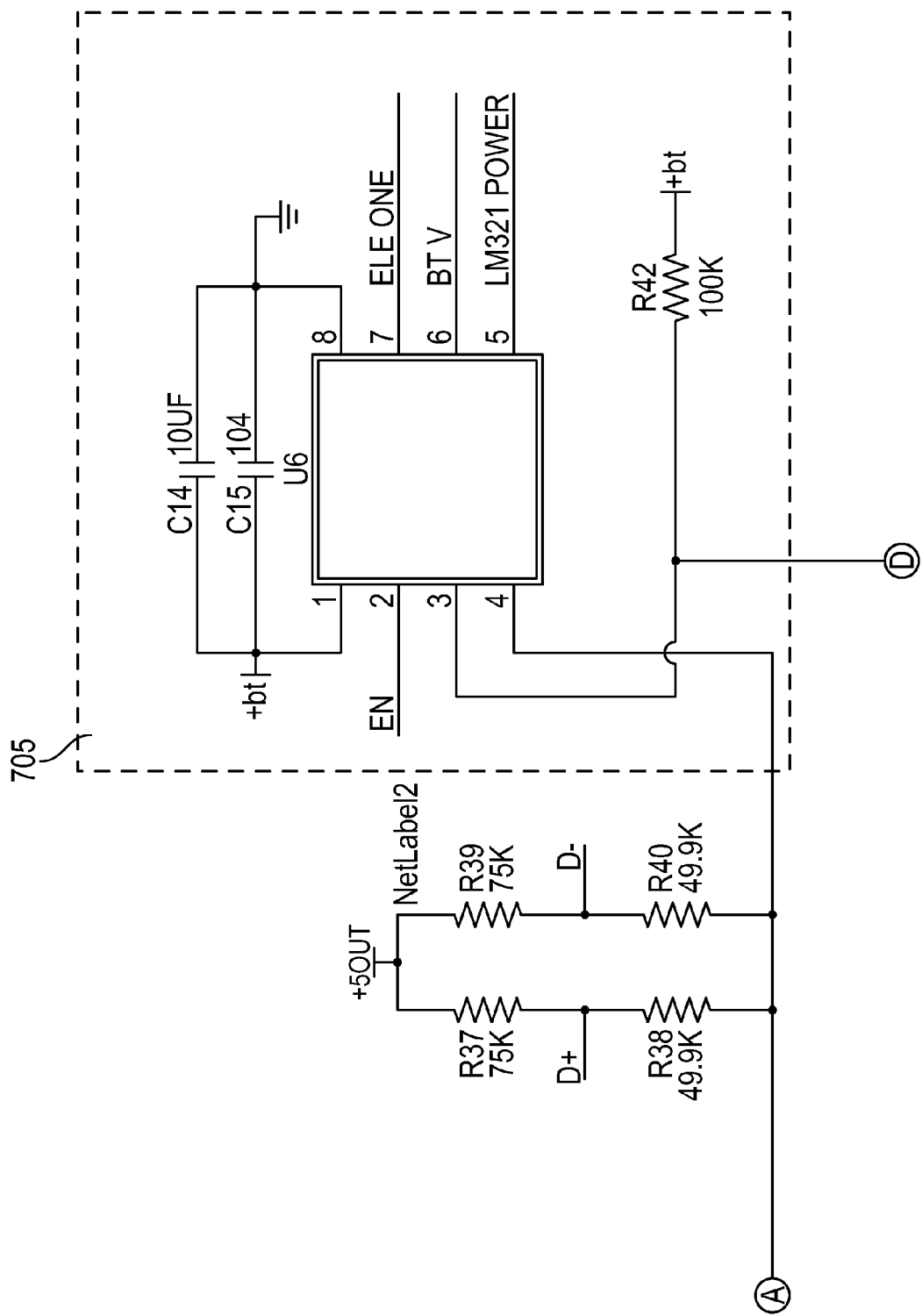
Figure 7C:
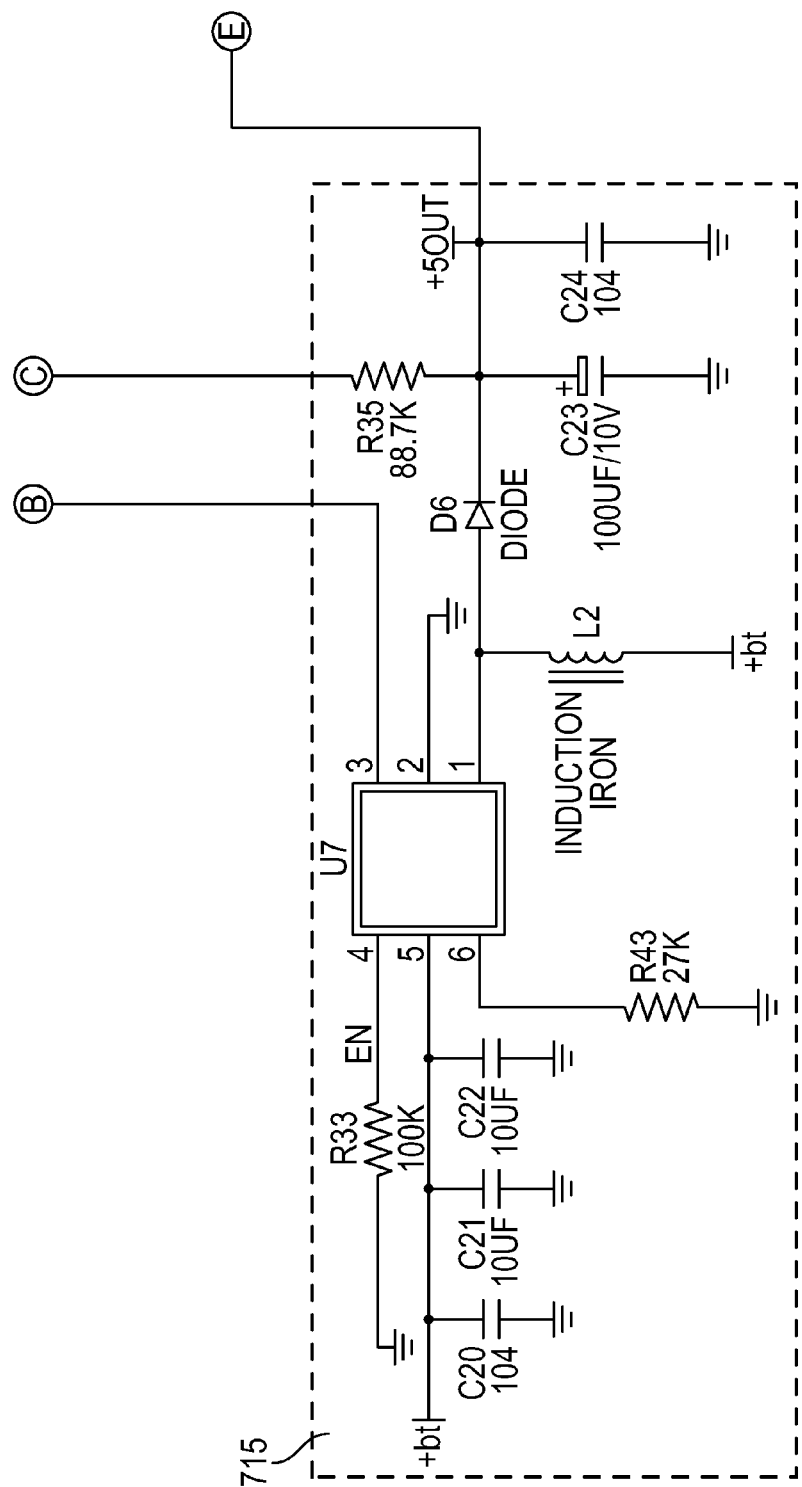
Figure 7D:
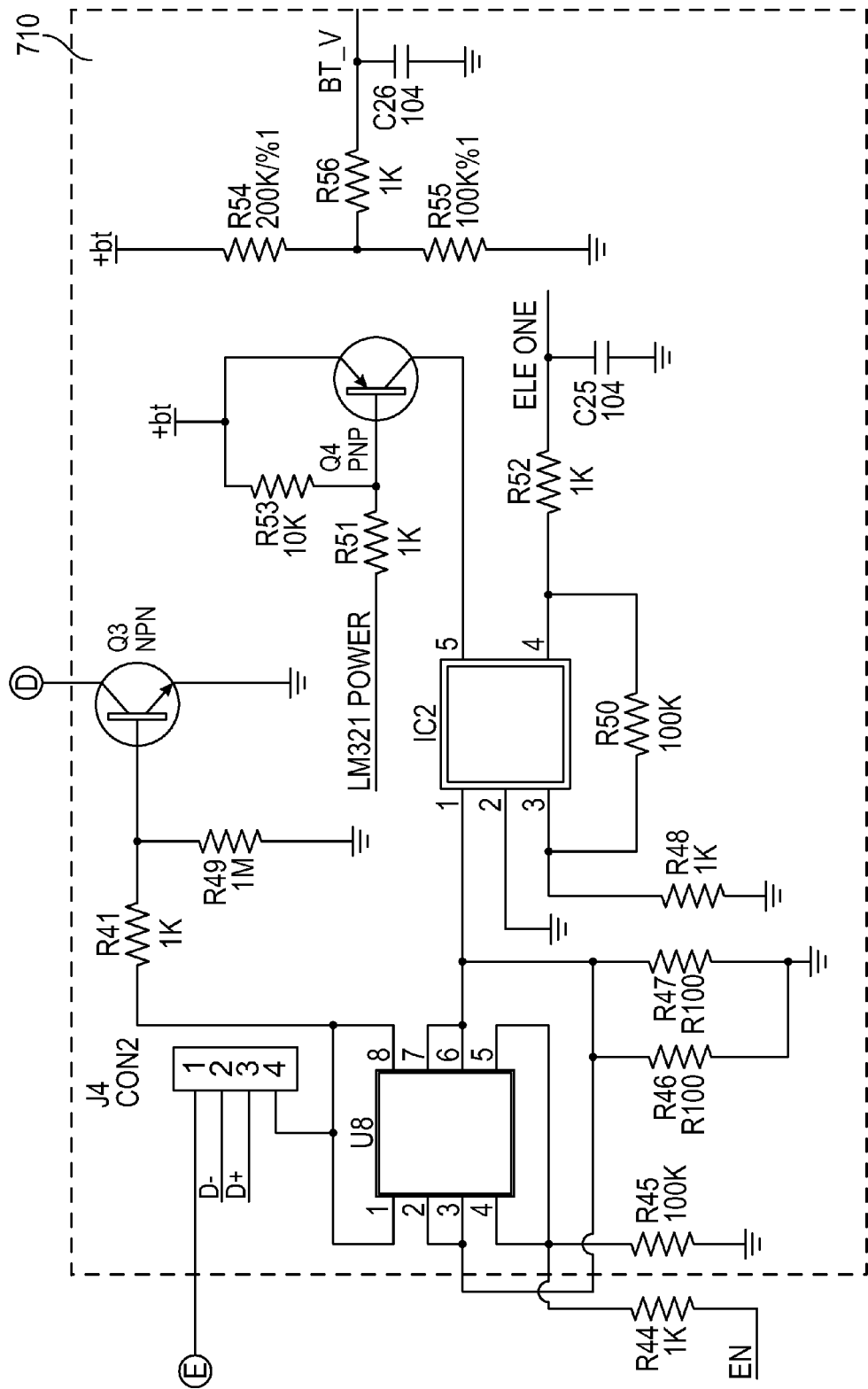

Referring now to FIGS. 6A and 6B, illustrative views of a charging system 600 including two separate charging devices 605, 610 coupled to one another are shown according to exemplary embodiments. Referring specifically to FIG. 6A, charging system 600 includes a first charging device 605 and a second charging device 610. In some embodiments, one or both of charging devices 605 and 610 may be substantially similar to charging device 100 and/or include similar features to those described with respect to charging device 100. Each of charging devices 605 and 610 includes an energy storage device such as a rechargeable battery. Each of charging devices 605 and 610 includes ends configured to be mated to modular adapters for receiving input power and/or providing output power. In the illustrated exemplary embodiment, charging device 605 is coupled to a modular adapter 620 having a male USB interface 625. Charging device 610 is coupled to a modular adapter 630 having a female interface 630 that is in turn configured to be mechanically and/or electrically coupled to a plurality of device adapters 635 for connecting to various devices. In various embodiments, female interface 630 and/or device adapters 635 may include USB, mini-USB, micro-USB, firewire, various proprietary interfaces, or any other type of interface.

Charging devices 605 and 610 are coupled to one another (e.g., mechanically and electrically) by a coupling adapter 615. Coupling adapter 615 may be configured to mechanically mate charging devices 605 and 610 so that the combined charging system 600 forms a substantially rigid structure. Coupling adapter 615 may be configured to electrically connect charging devices 605 and 610 such that the stored capacity of the energy storage devices of charging devices 605 and 610 is combined (e.g., in a series or parallel configuration). Chaining or coupling the energy storage devices of charging devices 605 and 610 may provide a greater stored energy capacity for use in charging connected devices (e.g., up to double the energy capacity of a single charging device). In various embodiments, charging devices 605 and 610 may be substantially the same types of devices (e.g., having the same energy storage capacities) or may be different devices (e.g., having different energy storage capacities).

FIG. 6B illustrates charging system 600 in an uncoupled configuration in which more detail of exemplary coupling adapter 615 is visible. Coupling adapter 615 includes male threaded portions on each side of coupling adapter 615 for mechanically coupling adapter 615 to corresponding female threaded portions of charging devices 605 and 610. Coupling adapter 615 may include electrical contacts (e.g., male electrical contacts) configured to be electrically mated with corresponding electrical contacts (e.g., female electrical contacts) of charging devices 605 and 610, such that energy storage devices of charging devices 605 and 610 are electrically coupled to one another (e.g., in a series configuration). In various alternative embodiments, different types of mechanical and/or electrical mating structures may be utilized.

Referring now to FIGS. 7A-7D, a circuit diagram of a circuit 700 of a charging device (e.g., charging devices 100, 605, and/or 610) is shown according to an exemplary embodiment. Microcontroller circuit 705 includes a microcontroller configured to control the flow of electrical current into and/or out of the battery. Power measurement circuit 710 includes various components used to receive and/or measure various properties (e.g., voltage, current, etc.) of the electrical power signals flowing into and out of the charging device. Power output circuit 715 is configured to receive power at a voltage associated with the battery (e.g., approximately 3.7V) and convert the voltage to a voltage appropriate for an output interface, such as USB (e.g., approximately 5V). Power input circuit 720 is configured to receive power from an external device (e.g., via USB) at a first voltage (e.g., approximately 5V) and convert the voltage to a second voltage (e.g., approximately 3.7V) suitable for charging the battery. While FIGS. 7A-7D illustrate various specific part numbers and/or properties (e.g., resistance, capacitance, voltage, current, etc.) of various components in circuit 700, it should be understood that in various exemplary embodiments other parts and/or properties may be utilized in the circuit of the charging device.

Figure 8:
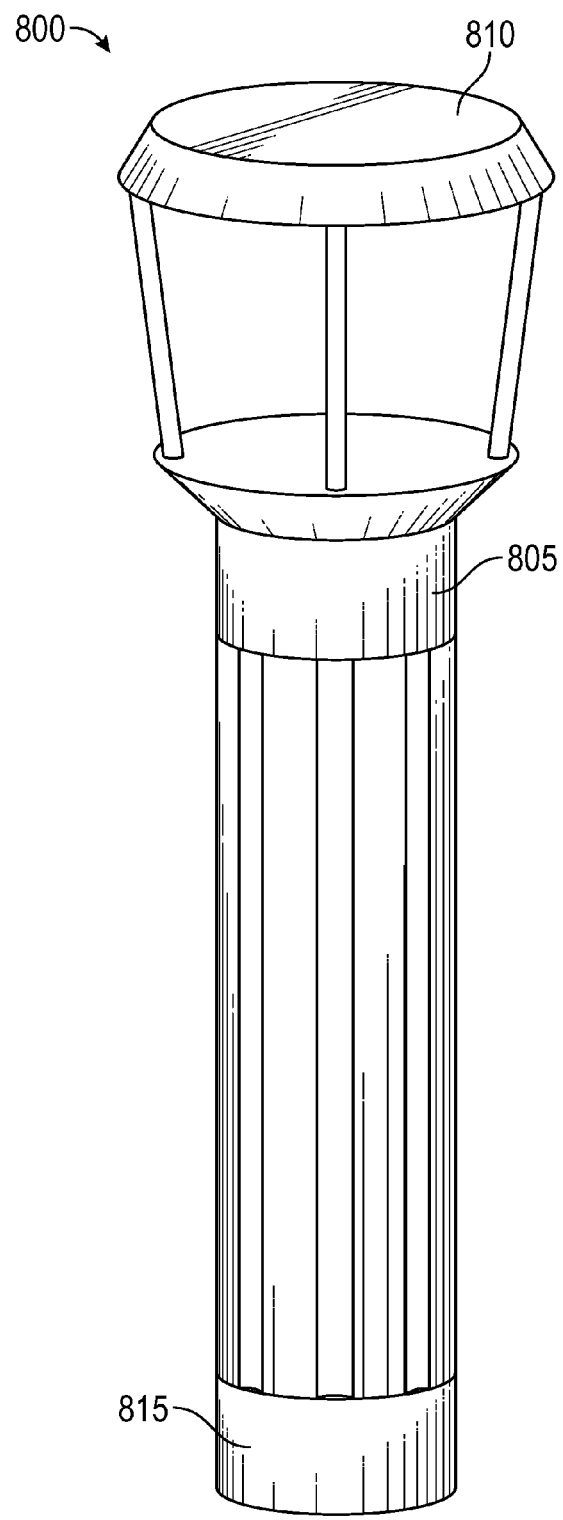
FIG. 8 is an illustrative view of a charging device including a lantern adapter according to an exemplary embodiment.

According to various exemplary embodiments, various different types of modular adapters may be coupled to the charging devices and/or systems disclosed herein. FIG. 8 illustrates a charging device 800 having a lantern adapter 810 according to an exemplary embodiment. Lantern adapter 810 may be configured to illuminate to provide light for use at night or in a dark space (e.g., similar in function to a flashlight or lantern). In some embodiments, lantern adapter 810 may be configured to be electrically connected to multiple electrical contacts of charging device 800 to increase a maximum current output to lantern adapter 810 and a corresponding maximum illumination of lantern adapter 810. In various exemplary embodiments, various different types of devices may be adapted for inclusion within or attachment to modular adapters of the charging devices. One exemplary adapter may be configured to serialize outputs from multiple contacts of the charging device to provide double the output voltage for certain applications (e.g., serialize two 3.7V outputs to provide a 7.4V output). One exemplary adapter may be configured to provide a variable voltage (e.g., 3.7V to 7.4V) that may be changed by a user, for example, using a dial. Various other types of adapters may be provided for use with the charging devices according to various exemplary embodiments.

According to various exemplary embodiments, a modular, portable, rechargeable energy storage and power supply device is shown that provides a reconfigurable platform, which can be customized for use in a wide variety of applications by interchangeably connecting various adapters and/or accessories. The modular, portable, rechargeable energy storage and power supply device provides a smart electrical contact system having concentric pins and rings operating at different voltage levels to support a wide variety of adapters and accessories that operate at different voltages. The applications include recharging applications for recharging other devices by connecting an adapter having the appropriate hardware to engage the device to be recharged. The hardware on the adapter may be selectively deployable between a stowed position and an engagement position (e.g. by folding into a compartment in the adapter or the like). The adapters for use with the energy storage and power supply device may also be configured as couplers to connect multiple energy storage and power supply devices to one another, e.g. in a series or parallel configuration to provide increased voltage or capacity. The applications also include coupling of a wide variety of accessories intended to be powered directly and primarily by the energy storage and power supply device. The accessories may be connected directly to the energy storage and power supply device, or indirectly through one or more adapters, and may include (among others) lighting devices (e.g. LED lights, flashlights, lanterns, etc.), medical devices, GPS devices, camping and/or expeditioning equipment, tools, wireless communication devices and other portable accessories that may be interchangeably coupled to the energy storage and power supply device. The adapters and accessories may also be combined in a variety of 'hybrid' configurations, such as adapters having multiple parallel output connections for receiving multiple accessories and/or further adapters (e.g. in the manner of a splitter or the like).

Figure 9:
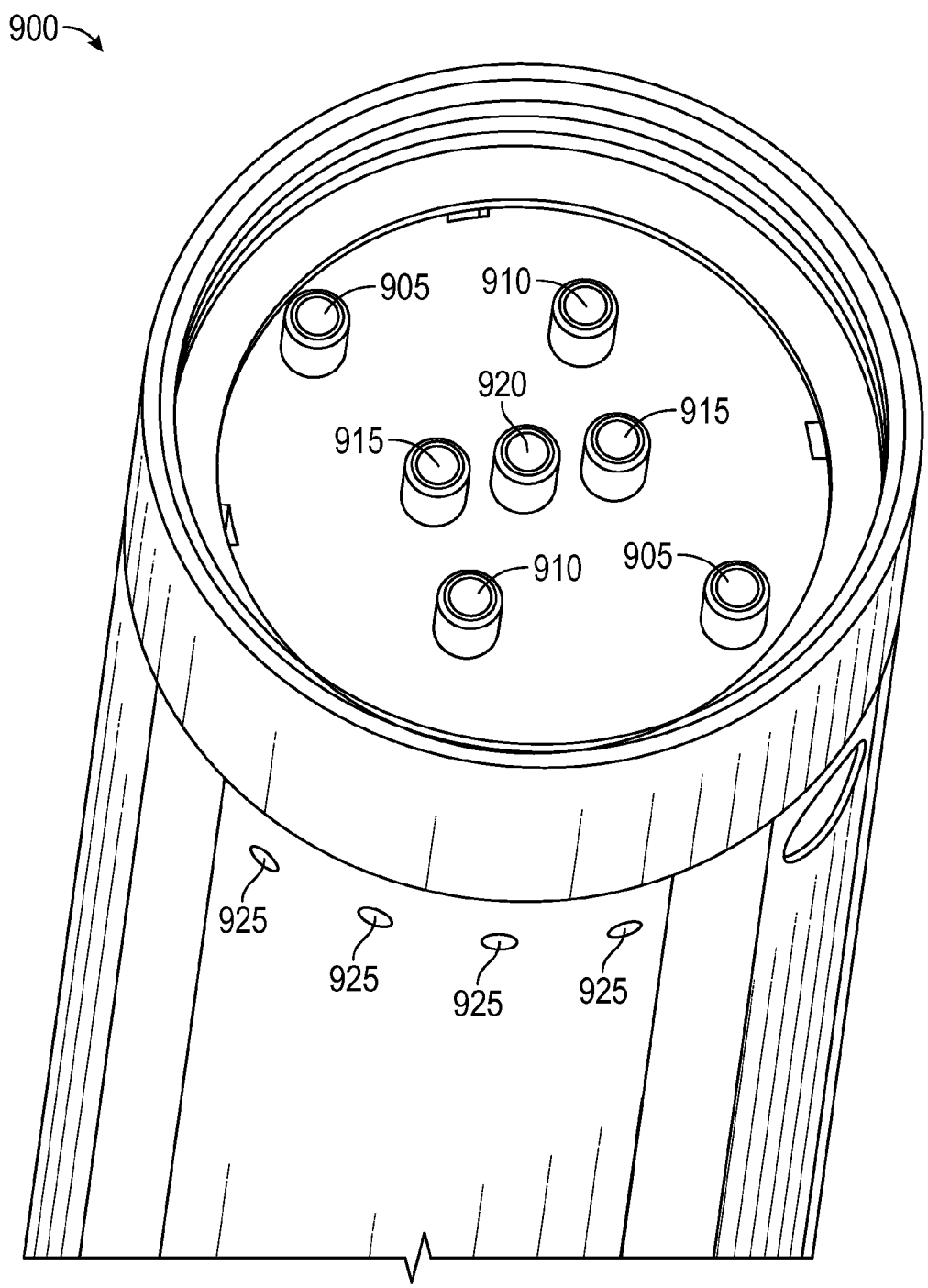
FIG. 9 is an illustrative view of an end of a charging device according to an exemplary embodiment.

Referring now to FIG. 9, an illustrative view of an end of a charging device 900 is shown according to an exemplary embodiment. Charging device 900 may operate in a similar fashion and/or include similar features to charging devices 100, 605, and/or 610 described above with respect to FIGS. 1-7.

Charging device 900 includes several contacts through which device 900 may transmit signals (e.g., power and/or data signals) between device 900 and modular adapters configured to mate with device 900. In the illustrated exemplary embodiment, first contacts 905 may be configured to transmit ground or negative reference voltage signals, second contacts 910 may be configured to transmit a first positive voltage signal (e.g., +5V), and third contacts 915 may be configured to transmit a second positive voltage signal (e.g., +3.7V). A fourth contact 920 may be configured to transmit data signals between device 900 and connected modular adapters. For example, in some embodiments, a charging circuit may be partially or completely housed in a modular charging adapter, and information regarding the charge level of a battery of device 900 may be transmitted to device 900 from the modular adapter. Such information may be displayed to a user using a visual indicator. In the illustrated embodiment, light emitting diodes (LEDs) 925 are used to indicate a charge level of the battery. For example, if the battery is charged to 60% of a maximum state of charge, two of LEDs 925 may be lit solid and a third may be blinking, indicating that the battery is charged to at least 50% and is in the process of being charged. It should be appreciated that the pin configuration and signals transmitted on certain pins may be different in different embodiments, and all such embodiments are contemplated by the present disclosure.

Figure 10:
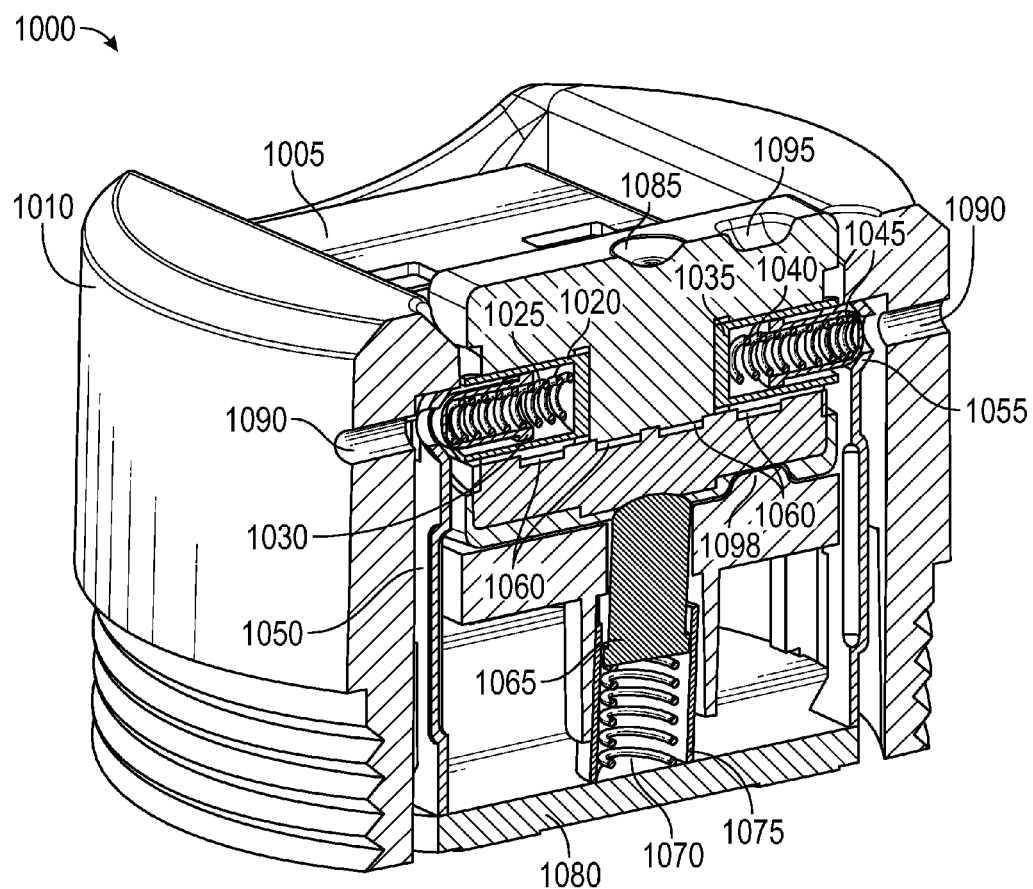
FIG. 10 is a cutaway perspective view of a modular adapter for use with a charging device such as the charging device shown in FIG. 9 according to an exemplary embodiment.
Figure 11:
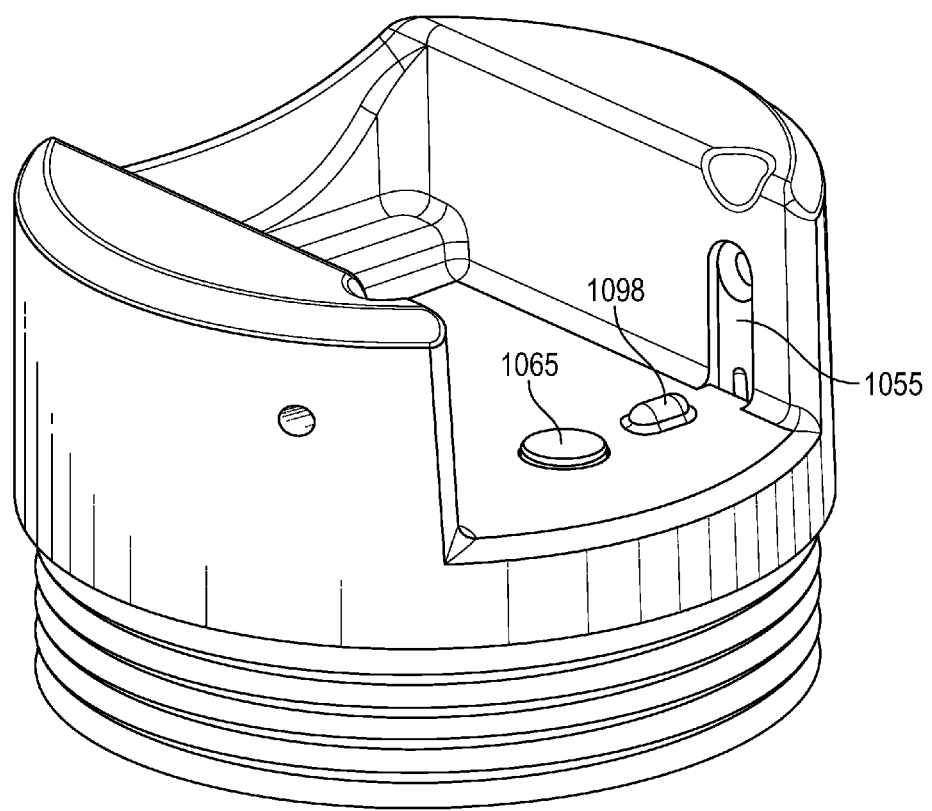
FIG. 11 is a cutaway perspective view of a body of the modular adapter shown in FIG. 10 according to an exemplary embodiment.
Figure 12:
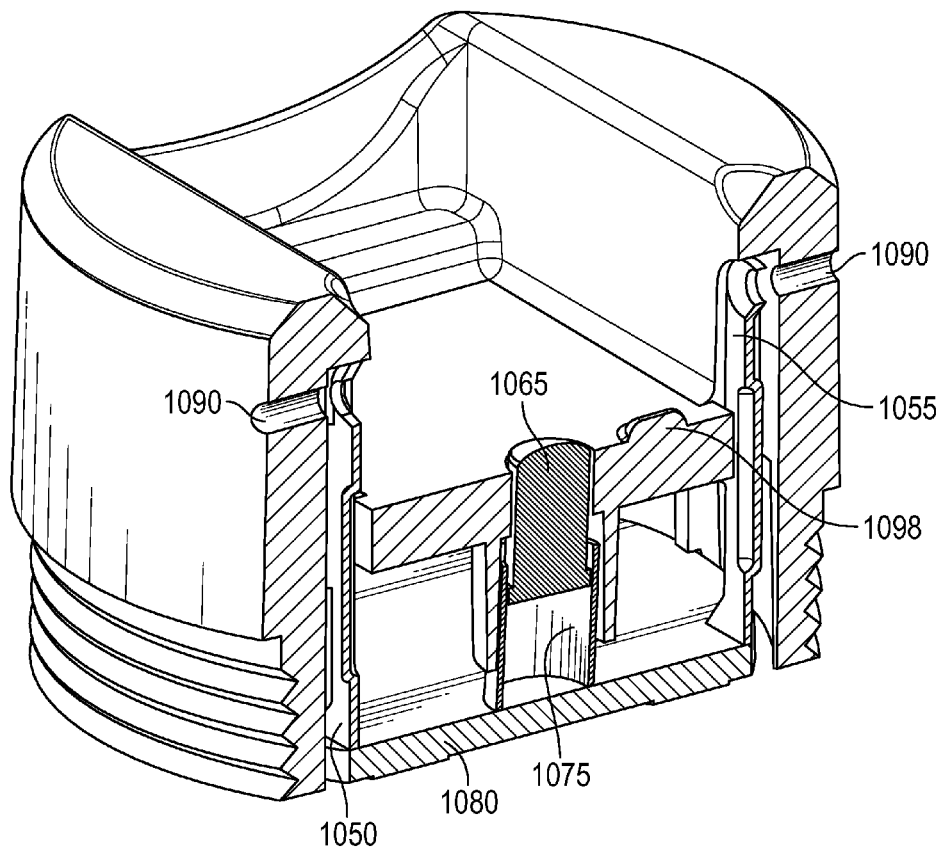
FIG. 12 is a cutaway perspective view of the modular adapter body shown in FIG. 11B according to an exemplary embodiment.

Referring now to FIG. 10, cutaway perspective views of a modular adapter 1000 for use with charging device 900 are shown according to an exemplary embodiment. Adapter 1000 may be used to transmit power between charging device 900 and a device attached to adapter 1000. Adapter 1000 or a similar adapter could additionally or alternatively be utilized with charging devices such as devices 100, 605, and/or 610. Adapter 1000 includes an interface 1005 for connecting with other devices (e.g., devices for supplying and/or receiving power), a body 1010, and a base 1080. In the illustrated embodiment, adapter 1000 includes an interface 1005 that includes a male USB port. In other embodiments, interface 1005 may include any other type of standard interface (e.g., mini-USB, micro-USB, Firewire, etc.) and/or proprietary interface (e.g., Apple 30-pin connector, Lightning connector, Thunderbolt connector, etc.). Adapter 1000 is configured such that interface 1005 can be flipped up during use (e.g., charging) and flipped down for storage to protect interface 1005 from being damaged.

Adapter 1000 is configured to transmit power between at least two of a plurality of conductors 1060 of interface 1005 and contacts of charging device 900. For example, in the illustrated embodiment, the USB interface includes a +5V power pin, a ground power pin, a positive data pin, and a negative data pin. Adapter 1000 includes a conductive sheath 1020 or envelope into which a conductive pin 1030 is placed. Sheath 1020 may be a cylindrical tube, an enclosure with a rectangular cross-section, or may have any other shape. Conductive sheath 1020 is electrically connected to the ground power pin of the USB connector of interface 1005 and to conductive pin 1030. Conductive pin 1030 is pressed against a conductive post 1050 (e.g., a rigid post). In the illustrated embodiment, a spring 1025 is used to press pin 1030 into consistent contact with post 1050. This may help with both the mechanical stability of the connection between pin 1030 and post 1050 as well as the consistency of the electrical connection between pin 1030 and post 1050. In some embodiments, spring 1025 may be made of a conductive material (e.g., copper) and may increase the electrical conductivity between sheath 1020 and pin 1030. Post 1050 is connected to negative or ground contact on a base 1080 of adapter 1000 that is configured to connect with first contacts 905 (e.g., ground contacts) of charging device 900 when adapter 1000 is mated with device 900. Together, sheath 1020, spring 1025, pin 1030, post 1050, and base 1080 provide a conductive path between the ground pin of interface 1005 and first contacts 905 (e.g., ground contacts) of charging device 900. A conductive sheath 1035, spring 1040 (e.g., a conductive spring), conductive pin 1045, conductive post 1055, and base 1080 similarly provide a conductive path between a positive power pin (e.g., +5V pin) of interface 1005, which is electrically connected to sheath 1035, and second contacts 910 of device 900, which are configured to be connected to a positive power contact of base 1080 to which post 1055 is connected. In some embodiments, springs 1025 and/or 1040 may be removed or replaced with another conductive or nonconductive element designed to press pins 1030 and 1045 into consistent contact with posts 1050 and 1055, such as a compressible material (e.g., rubber), a curved washer, etc.

Pins 1030 and 1045 and posts 1050 and 1055 also provide a mechanical structure that enables interface 1005 to pivot about an axis defined by pins 1030 and 1045. Interface 1005 can be swiveled and placed into a use position (e.g., a vertical position) when interface 1005 is going to be connected to a device and into a storage position (e.g., a horizontal position) when interface 1005 is not in use. A swivel track 1095 and protrusion 1098 may help ensure that interface 1005 swivels only about the axis and does not shift during pivoting. A base portion of interface 1005 may include one or more recesses 1085 into which a stop member 1065 may be pressed. Stop member 1065 extends out of a stop member sheath 1075 mounted to base 1080 and is pressed against interface 1005 by a spring 1070 or other compressible element. When interface 1005 is rotated to a position at which stop member 1065 extends into a recess 1085, stop member 1065 may provide resistance that tends to cause interface 1005 to remain in that position until sufficient force is applied to interface 1005 to cause stop member 1065 to withdraw from recess 1085 and allow interface 1005 to rotate.

In some embodiments, body 1010 may include slots 1090 through which an object (e.g., a pin or paperclip) may be extended to push pins 1030 and 1045 back into sheaths 1020 and 1035. This may allow a user to disengage and/or remove interface 1005 from adapter 1000. In some embodiments, slots 1090 may be used to remove interface 1005 to make repairs to or replace interface 1005 or other components of adapter 1000. In some embodiments, a plurality of different types of interfaces may be configured to be used with adapter 1000 (e.g., a USB interface, a mini-USB interface, a micro-USB interface, a Firewire interface, proprietary interfaces, etc.), and slots 1090 may be used to swap the current interface with a different interface.

Figure 13:
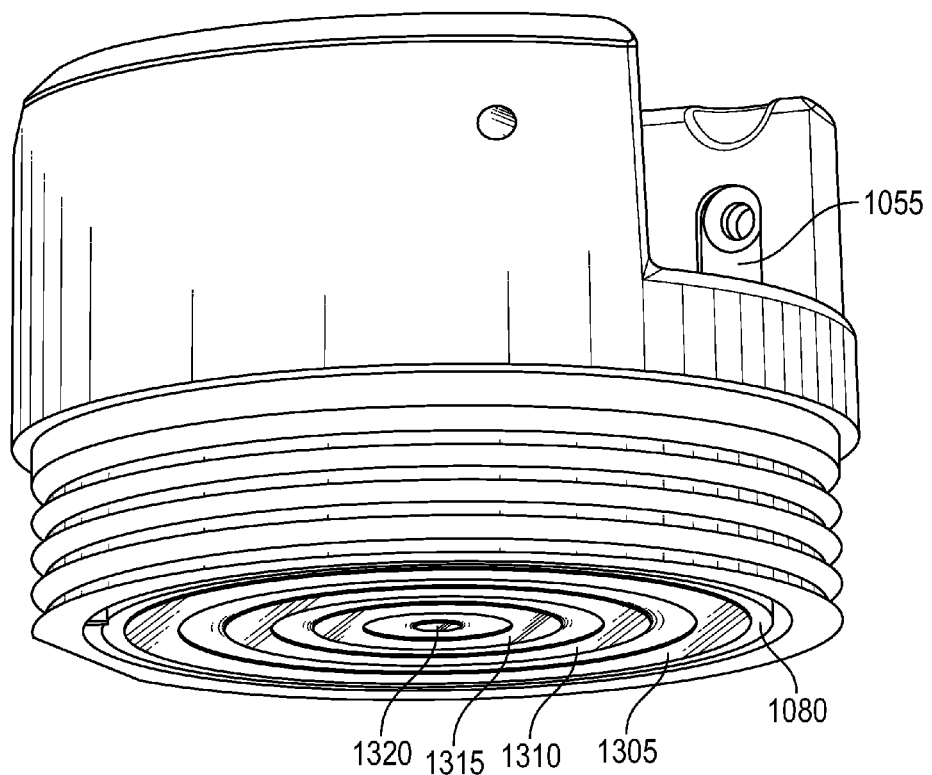
FIG. 13 is a perspective view illustrating an underside of the modular adapter body shown in FIG. 11, including a base, according to an exemplary embodiment.
Figure 14:
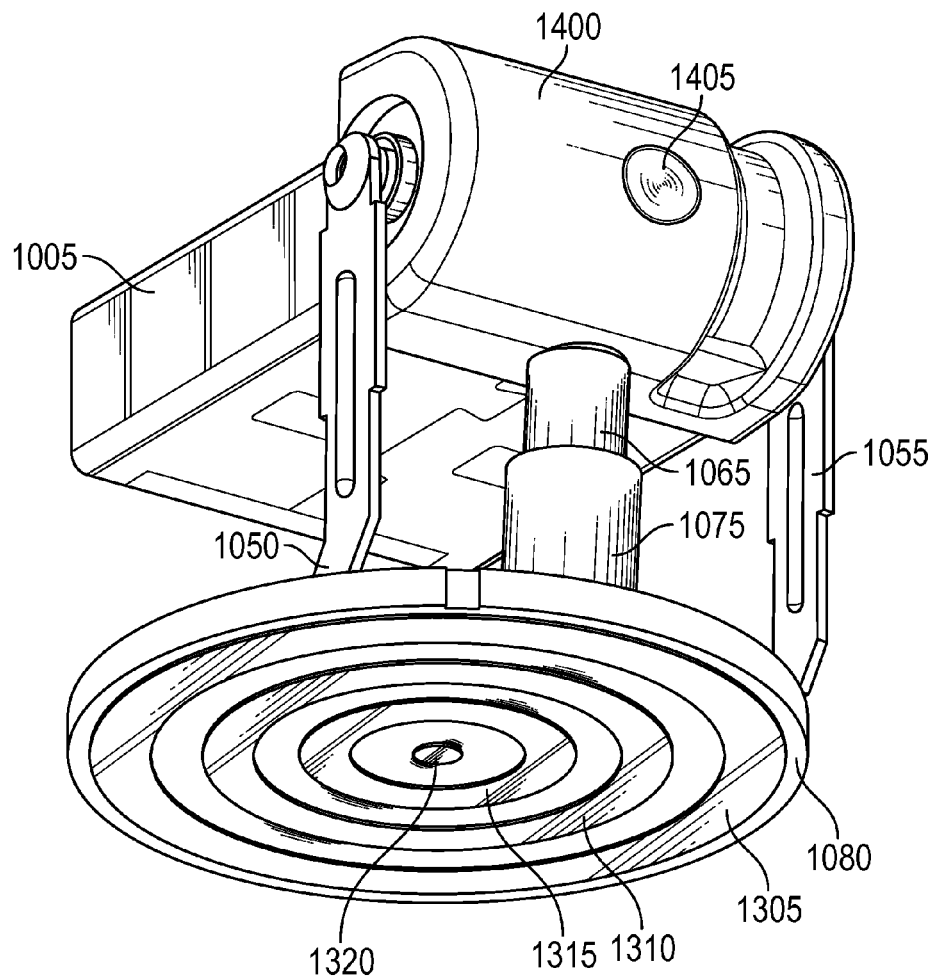
FIG. 14 is a perspective view of the electrical components of the modular adapter shown in FIG. 10, including the base, posts, and interface, according to an exemplary embodiment.
Figure 15A:
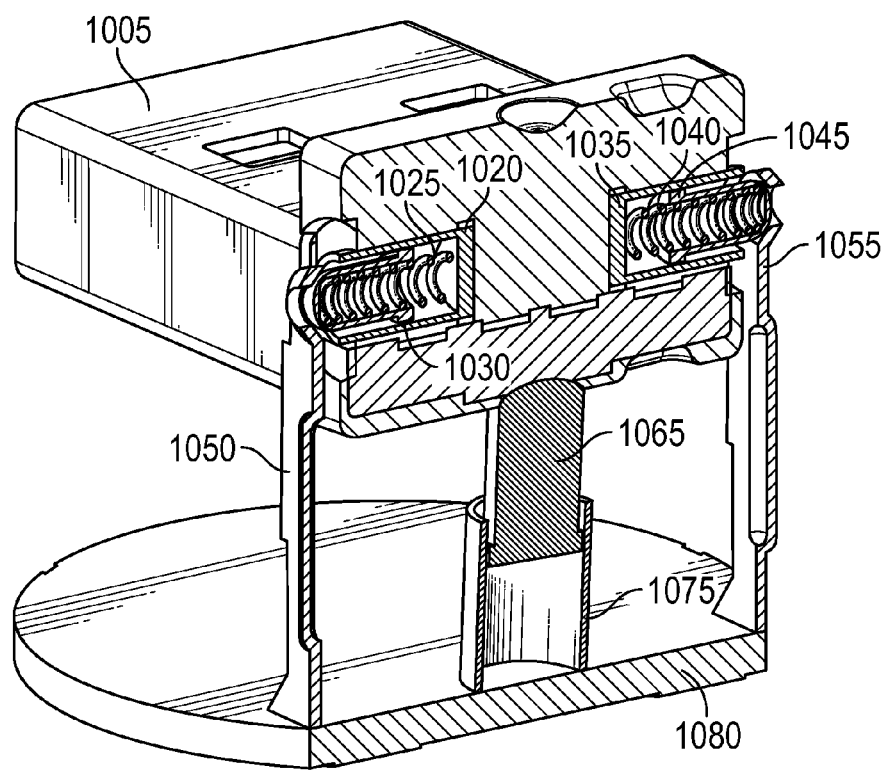
FIGS. 15A through 15B are cutaway perspective views of the components of the modular adapter shown in FIG. 14 according to an exemplary embodiment.
Figure 15B:
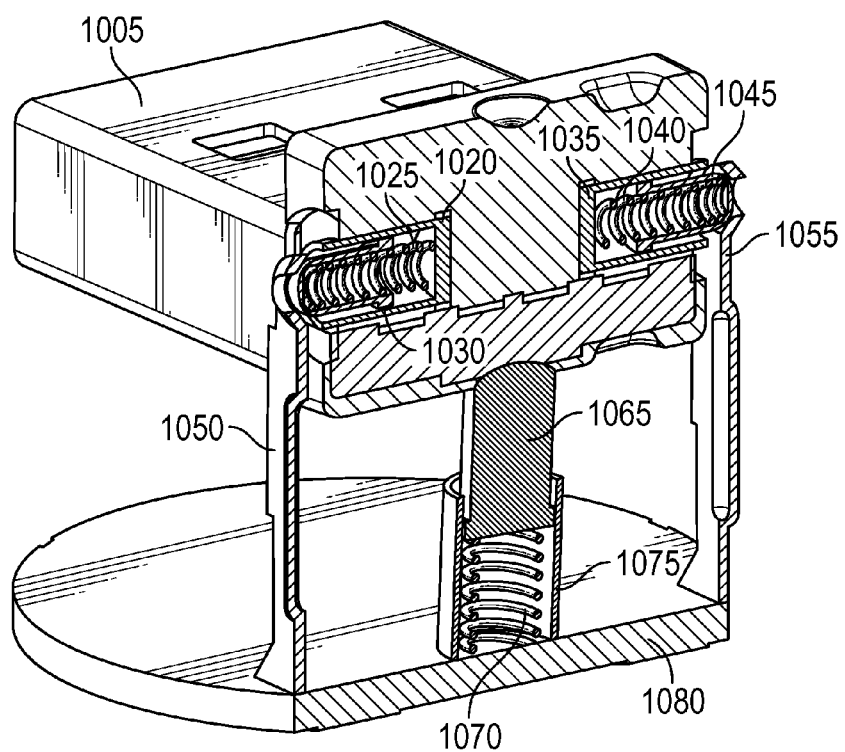
Figure 16:
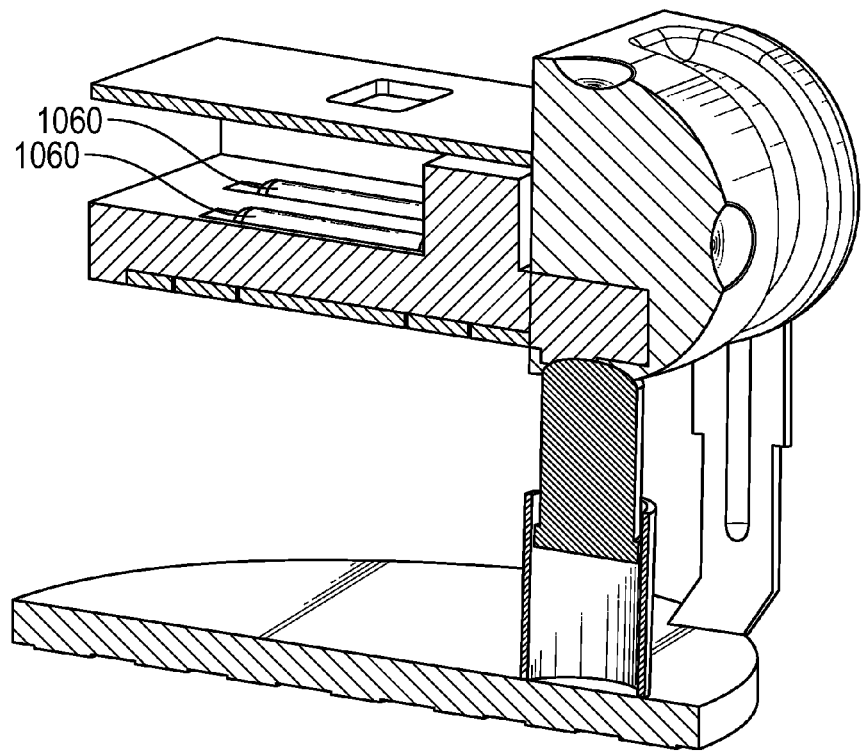
FIG. 16 is a bisecting cutaway perspective view of the components of the modular adapter shown in FIG. 14 according to an exemplary embodiment.
Figure 17:
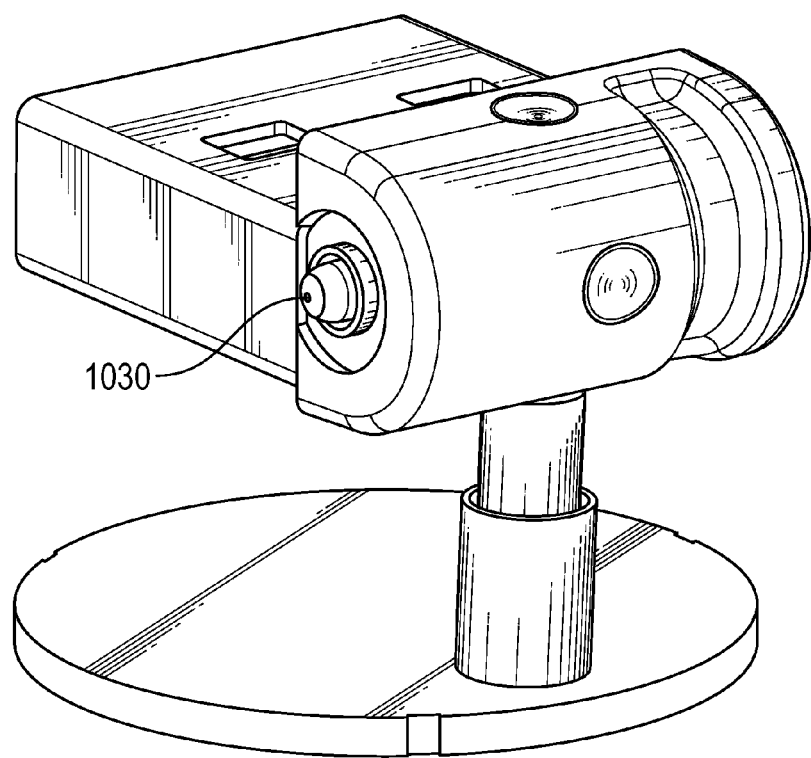
FIG. 17 is a perspective view of the interface and base without the posts that electrically connect the interface to the base according to an exemplary embodiment.
Figure 18:
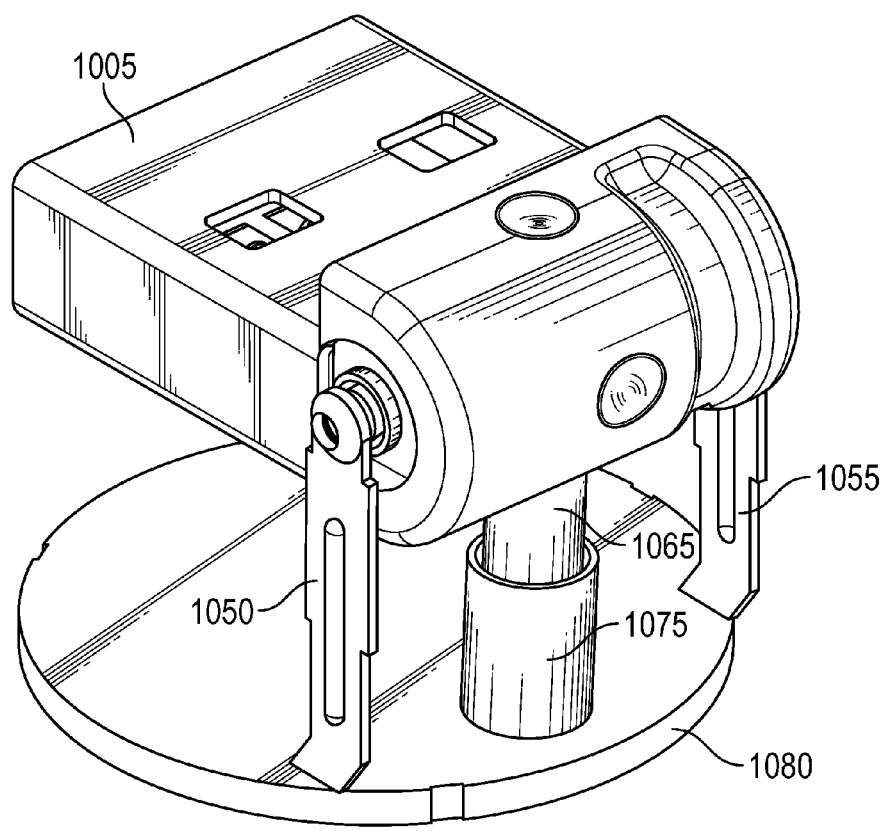
FIGS. 18 and 19 are additional perspective views of the components of the modular adapter shown in FIG. 14 according to an exemplary embodiment.
Figure 19:
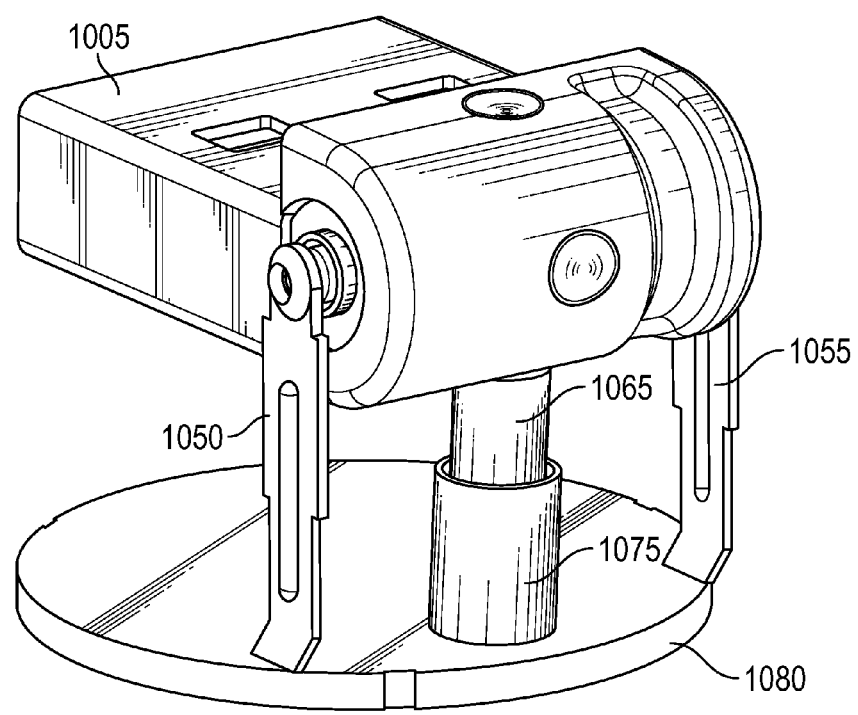

FIGS. 11 through 19 provide various additional views (e.g., perspective and/or cutaway views) of components of adapter 1000 shown and described with respect to FIG. 10. Referring specifically to FIG. 13, contacts on base 1080 configured to connect with corresponding contacts of device 900 when adapter 1000 is mated to device 900 are shown. First contact 1305 may be a ground contact electrically connected to post 1050 (e.g., the negative or ground post) and configured to be connected to first contacts 905 (e.g,. ground contacts) of charging device 900 to provide a conductive path between a ground pin of interface 1005 and first contacts 905 of device 900. Second contact 1310 may be a positive power contact electrically connected to post 1055 (e.g., the positive power post) and configured to be connected to second contacts 910 (e.g,. +5V contacts) of charging device 900 to provide a conductive path between a positive power pin of interface 1005 and second contacts 910 of device 900. In some embodiments, a third contact 1315 and/or fourth contact 1320 may be configured to transmit power at a different voltage (e.g., +3.7V), data from a circuit embedded in adapter 1000, and/or data from data pins of interface 1005. FIG. 14 illustrates a base housing 1400 of interface 1005 having a rear recess 1405 into which stop member 1065 may extend to hold interface 1005 in an use or vertical configuration. FIG. 17 provides a view of interface 1005 and base 1080 without posts 1050 and 1055 in which an outer end of pin 1030 can be seen according to one exemplary embodiment.

Figure 20A:
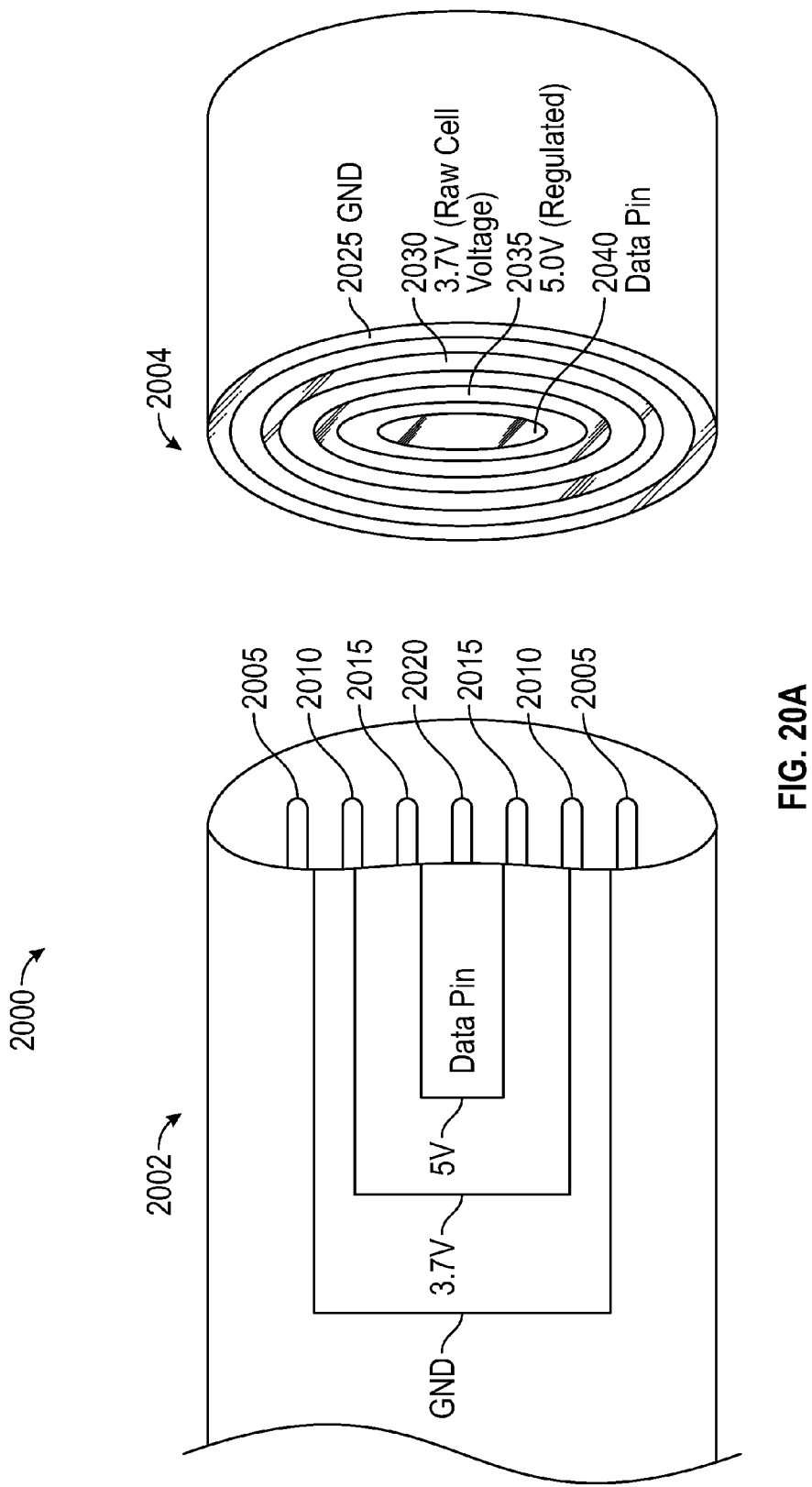
FIG. 20A is an illustration of the input/output interfaces of a charging device and modular adapter according to an exemplary embodiment.

Referring now to FIG. 20A, an illustration of input/output interfaces of a charging device 2002 and a modular adapter 2004 are shown according to an exemplary embodiment. Charging device 2002 and modular adapter 2004 may include similar features and/or characteristics to the charging devices and modular adapters described above. Charging device 2002 includes an input-output interface with ground pins 2005, 3.7V pins 2010, 5V pins 2015, and a data pin 2020. The input-output interface of device 2002 is configured to electrically mate with a corresponding input/output interface of modular adapter 2004, which includes a ground contact 2025, 3.7V contact 2030, 5V contact 2035, and data contact 2040. In the illustrated embodiment, 5V may be the native input/output voltage of devices connected to an interface of adapter 2004 and 3.7V may be a raw cell voltage of a battery cell of device 2002. In other embodiments, the native input/output voltage associated with the interface of adapter 2002 and/or the raw cell voltage of the battery cell of device 2002 may include different values.

Figure 20B:
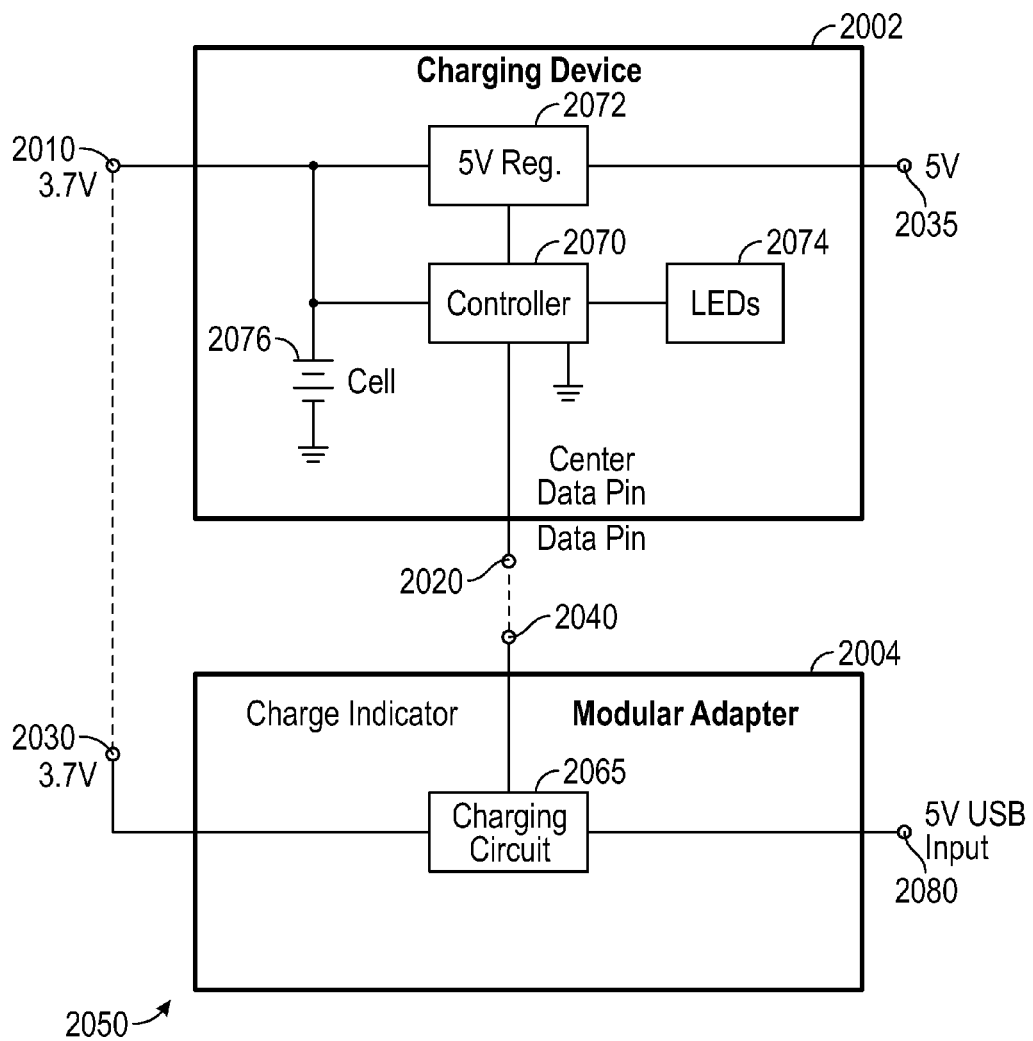
FIG. 20B is a block diagram of an electrical circuit formed by the charging device and modular adapter of FIG. 20A according to an exemplary embodiment.

In some embodiments, charging device 2002 and modular adapter 2004 may be configured such that 5V input power received by an external interface of adapter 2004 is regulated or converted to the raw cell voltage of 3.7V inside adapter 2004 before being transmitted to device 2002. Referring to FIG. 20B, a block diagram of an electrical circuit 2050 formed by charging device 2002 and modular adapter 2004 is shown according to an exemplary embodiment. Adapter 2004 includes a charging circuit 2065 that is configured to convert input signals at one voltage into output signals having a different voltage. For example, in the illustrated embodiment, charging circuit 2065 is configured to receive input power for charging a battery cell 2076 of device 2002 from an external device through a USB interface at a voltage of 5V. Charging circuit 2065 is configured to convert the power signal to the raw voltage of cell 2076, 3.7V, and output the converted power signal over 3.7V contact 2030. The converted power signal is received at 3.7V pins 2010 of charging device 2002 and used to charge cell 2076. A charging indicator signal (e.g., a digital signal) may be transmitted from charging circuit 2065 through data contact 2040 to data pin 2020 and then to a controller 2070. The charging indicator signal may indicate to controller 2070 when input power is being received and the battery is being charged. Controller 2070 may use this data (e.g., along with a current charge level of cell 2076) to illuminate LEDs 2074 or other visual indicators to notify a user of the current charge status and/or charge level of cell 2076. Data pin 2020 and data contact 2040 may serve as a one-wire data bus between controller 2070 and charging circuit 2065 of adapter 2004. In some embodiments, the bus may support multiple addressed slave devices with controller 2070 serving as the master device. In some embodiments, power may be output from cell 2076 at 3.7V, upconverted to 5V by charging circuit 2065 of adapter 2004, and output through the USB interface to power an external device. A 5V regulator circuit 2072 may be used to upconvert voltage from 3.7V to 5V to output power to attached external devices from cell 2076.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and/or program products on any machine-readable media for accomplishing its operations. The embodiments of the present disclosure may be implemented using an existing computer processor, or by a special purpose computer processor incorporated for this or another purpose or by a hard-wired system. Any type of processor may be used (e.g., FPGA, ASIC, ASIP, CPLD, SDS, etc.). No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure may include program products including machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure may be described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted.

Also, two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A charging device comprising:
   a body comprising a rechargeable energy storage device and a housing;
   an interface pivotally coupled to the housing, the interface comprising a first conductor and a second conductor and configured to transmit power between the rechargeable energy storage device and a device connected to the interface;
   a first rigid post coupled to a first contact associated with the rechargeable energy storage device;
   a first pin configured to couple the first rigid post to the first conductor of the interface such that the first pin and the first rigid post provide a conductive path from the first conductor of the interface to the first contact;
   a first compressible element positioned to press the first pin against the first rigid post;
   a second rigid post coupled to a second contact associated with the rechargeable energy storage device;
   a second pin configured to couple the second rigid post to the second conductor of the interface such that the second pin and the second rigid post provide a conductive path from the second conductor of the interface to the second contact;
   a second compressible element positioned to press the second pin against the second rigid post,
   wherein the interface is configured to pivot about an axis defined by the first pin and the second pin.

2. The charging device of claim 1, wherein the first compressible element comprises a first spring, and wherein the second compressible element comprises a second spring.

3. The charging device of claim 1, wherein the interface is configured to pivot relative to the housing between a use position and a storage position, and wherein the charging device further comprises a stop member configured to press against a portion of the interface and provide resistance to releasably secure the interface in at least one of the use position and the storage position.

4. The charging device of claim 3, wherein the interface comprises one or more recesses that the stop member is configured to engage and thereby releasably secure the interface in at least one of the use position and the storage position.

5. The charging device of claim 4, further comprising a stop member sheath coupled to the housing and a third compressible element positioned to press the stop member against the interface, wherein the stop member extends from the stop member sheath.

6. The charging device of claim 3, wherein the interface defines a track, and wherein the charging device further comprises a protrusion configured to engage the track and prevent the interface from shifting as it pivots between the use position and the storage position.

7. The charging device of claim 1, further comprising a first conductive sheath that receives at least a portion of the first pin and a second conductive sheath that receives at least a portion of the second pin, wherein the first conductive sheath is electrically coupled with the first conductor of the interface, and wherein the second conductive sheath is electrically coupled with the second conductor of the interface.

8. A charging device comprising:
   a body comprising a rechargeable energy storage device and a housing, wherein the housing comprises at least a first coupling portion; and
   a modular adapter having a second coupling portion configured to be mated to the first coupling portion of the housing, the modular adapter comprising:
      an interface comprising a first conductor and a second conductor and configured to transmit power between the rechargeable energy storage device and a device connected to the interface;
      an adapter base comprising a plurality of contacts configured to be electrically coupled with contacts of the body;
      a first rigid post coupled to a first contact of the adapter base;
      a first pin configured to couple the first rigid post to the first conductor of the interface such that the first pin and the first rigid post provide a conductive path from the first conductor of the interface to the first contact of the adapter base;
      a first compressible element positioned to press the first pin against the first rigid post;
      a second rigid post coupled to a second contact of the adapter base;
      a second pin configured to couple the second rigid post to the second conductor of the interface such that the second pin and the second rigid post provide a conductive path from the second conductor of the interface to the second contact of the adapter base; and
      a second compressible element positioned to press the second pin against the second rigid post,
      wherein the interface is configured to pivot about an axis defined by the first pin and the second pin,
   wherein, when the modular adapter is mated to the housing, the body and the modular adapter form a single substantially rigid structure.

9. The charging device of claim 8, wherein the first compressible element comprises a first spring, and wherein the second compressible element comprises a second spring.

10. The charging device of claim 8, wherein the interface is configured to pivot relative to the adapter base between a use position and a storage position, and wherein the modular adapter further comprises a stop member configured to press against a portion of the interface and provide resistance to releasably secure the interface in at least one of the use position and the storage position.

11. The charging device of claim 10, wherein the interface comprises one or more recesses that the stop member is configured to engage and thereby releasably secure the interface in at least one of the use position and the storage position.

12. The charging device of claim 11, wherein the modular adapter further comprises a stop member sheath coupled to the adapter base and a third compressible element positioned to press the stop member against the interface, wherein the stop member extends from the stop member sheath.

13. The charging device of claim 10, wherein the interface defines a track, wherein the modular adapter further comprises a protrusion configured to engage the track and prevent the interface from shifting as it pivots between the use position and the storage position.

14. The charging device of claim 8, further comprising a first conductive sheath that receives at least a portion of the first pin and a second conductive sheath that receives at least a portion of the second pin, wherein the first conductive sheath is electrically coupled with the first conductor of the interface, and wherein the second conductive sheath is electrically coupled with the second conductor of the interface.

15. A modular adapter for a charging device comprising:
an interface comprising a first conductor and a second conductor and configured to transmit power between the charging device and a device connected to the interface;
an adapter base comprising a plurality of contacts configured to be electrically coupled with contacts of the charging device;
a first rigid post coupled to a first contact of the adapter base;
a first pin configured to couple the first rigid post to the first conductor of the interface such that the first pin and the first rigid post provide a conductive path from the first conductor of the interface to the first contact of the adapter base;
a first compressible element positioned to press the first pin against the first rigid post;
a second rigid post coupled to a second contact of the adapter base;
a second pin configured to couple the second rigid post to the second conductor of the interface such that the second pin and the second rigid post provide a conductive path from the second conductor of the interface to the second contact of the adapter base; and
a second compressible element positioned to press the second pin against the second rigid post,
wherein the interface is configured to pivot about an axis defined by the first pin and the second pin.

16. The modular adapter of claim 15, wherein the first compressible element comprises a first spring, and wherein the second compressible element comprises a second spring.

17. The modular adapter of claim 15, wherein the interface is configured to pivot relative to the adapter base between a use position and a storage position, and wherein the modular adapter further comprises a stop member configured to press against a portion of the interface and provide resistance to releasably secure the interface in at least one of the use position and the storage position.

18. The modular adapter of claim 17, wherein the interface comprises one or more recesses that the stop member is configured to engage and thereby releasably secure the interface in at least one of the use position and the storage position.

19. The modular adapter of claim 18, further comprising a stop member sheath coupled to the adapter base and a third compressible element positioned to press the stop member against the interface, wherein the stop member extends from the stop member sheath.

20. The modular adapter of claim 17, wherein the interface defines a track, wherein the modular adapter further comprises a protrusion configured to engage the track and prevent the interface from shifting as it pivots between the use position and the storage position.

21. The modular adapter of claim 15, further comprising a first conductive sheath that receives at least a portion of the first pin and a second conductive sheath that receives at least a portion of the second pin, wherein the first conductive sheath is electrically coupled with the first conductor of the interface, and wherein the second conductive sheath is electrically coupled with the second conductor of the interface.

* * * * *